United States Patent [19]

Elabd

[11] Patent Number: 4,758,895

[45] Date of Patent: Jul. 19, 1988

[54] STORAGE REGISTERS WITH CHARGE PACKET ACCUMULATION CAPABILITY, AS FOR SOLID-STATE IMAGERS

[75] Inventor: Hammam Elabd, Mercer County, N.J.

[73] Assignee: RCA Corporation, Princeton, N.J.

[21] Appl. No.: 938,863

[22] Filed: Dec. 8, 1986

Related U.S. Application Data

[63] Continuation-in-part of Ser. No. 797,236, Nov. 12, 1985, abandoned.

[51] Int. Cl.$^4$ .............................................. H04N 3/14
[52] U.S. Cl. ............................ 358/213.26; 358/213.22
[58] Field of Search ...................... 358/213.26, 213.29, 358/213.31, 213.22, 213.25; 357/24 LR

[56] References Cited

U.S. PATENT DOCUMENTS 4,605,862  8/1986  Takeshita ....................... 358/213.31
4,620,231  10/1986  Kosonocky ...................... 358/213.26

Primary Examiner—Jin F. Ng
Assistant Examiner—Stephen Brinich
Attorney, Agent, or Firm—Allen LeRoy Limberg

[57] ABSTRACT

A CCD storage register for storing an area array of picture elements in a solid-state imager comprises a plurality of charge transfer channels in a parallel array. Charge transfer stages in those channels have corresponding charge storage sites facilitating charge transfer from each charge transfer stage to its corresponding charge storage site. Provisions are also made for charge transfer from each charge storage site back to its corresponding charge transfer stage or to a subsequent charge transfer stage. Such charge transfer schemes allows shift and add procedures to be carried forward in the CCD storage register. The shift and add capability allows time-delay-integration procedures and true line interlacing procedures, as examples, to be carried forward in the CCD storage register.

32 Claims, 26 Drawing Sheets

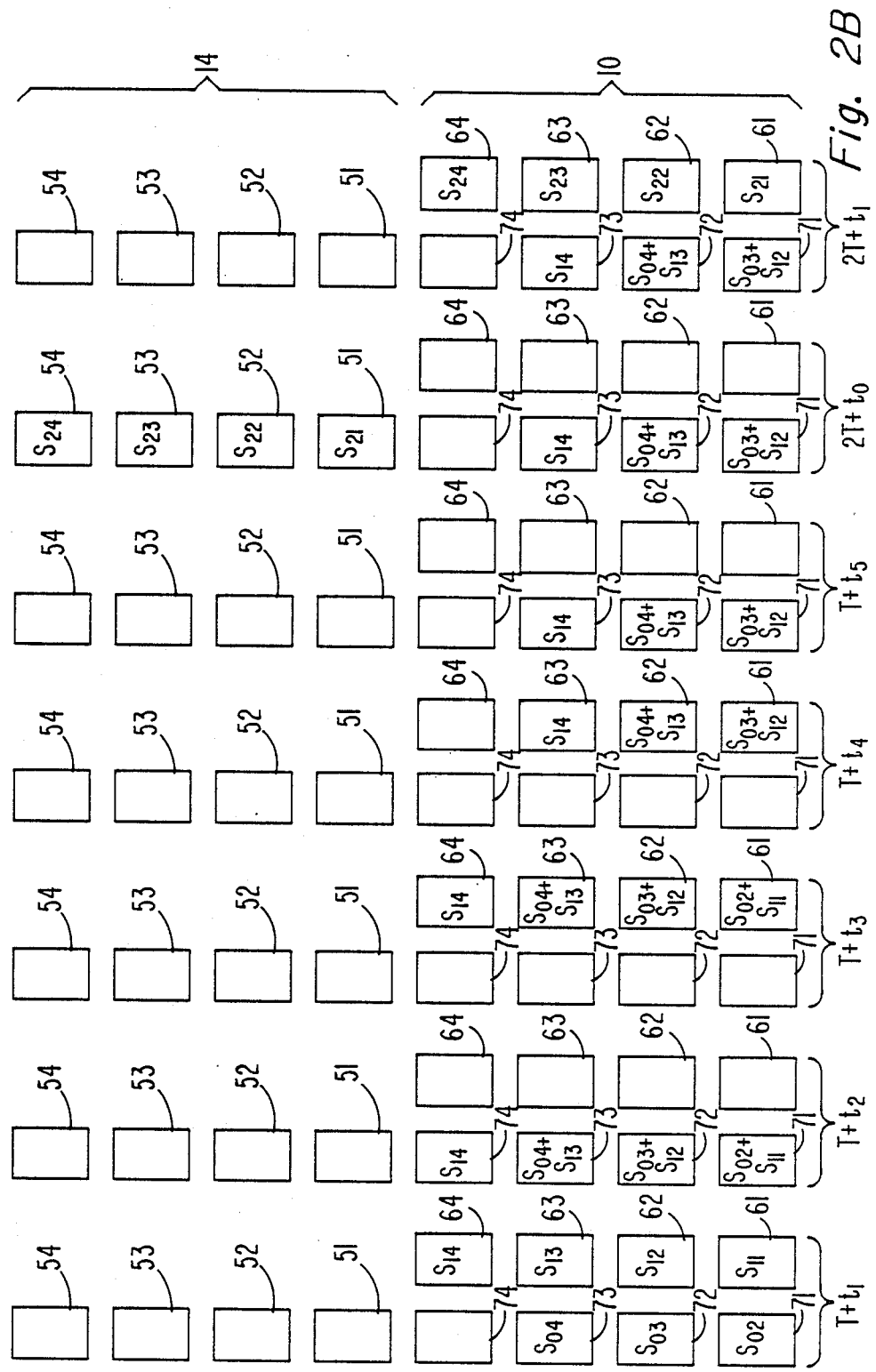

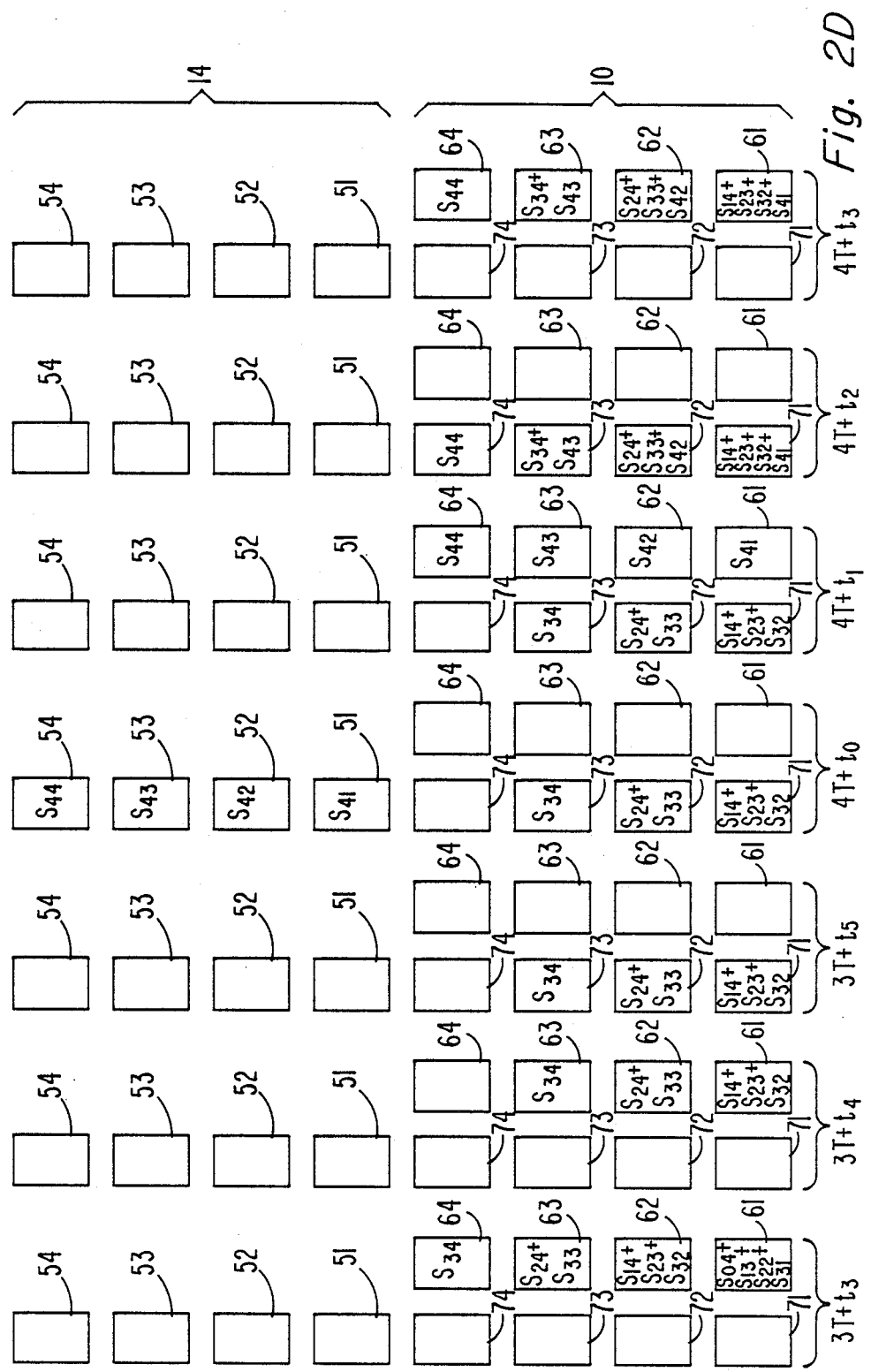

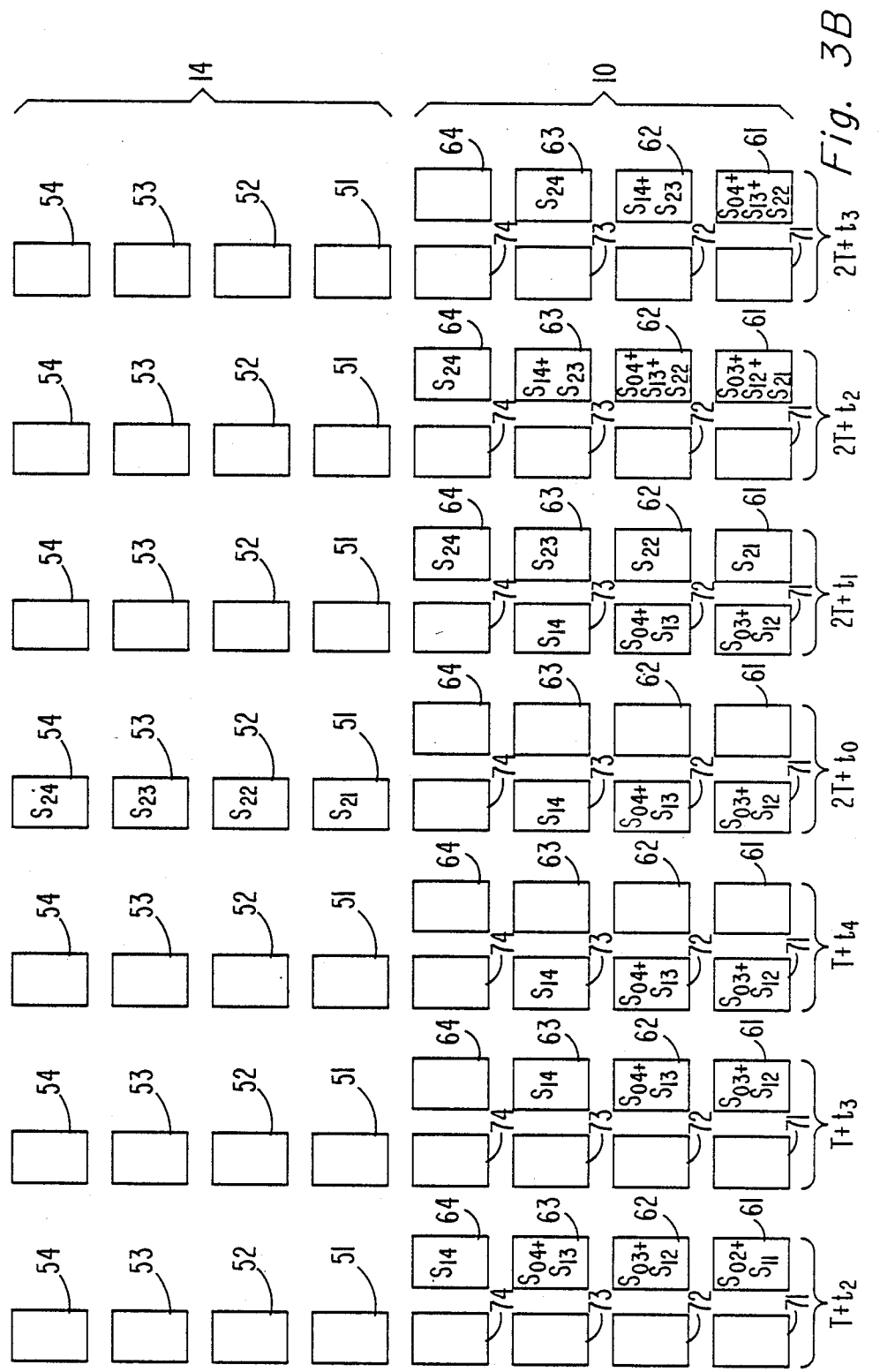

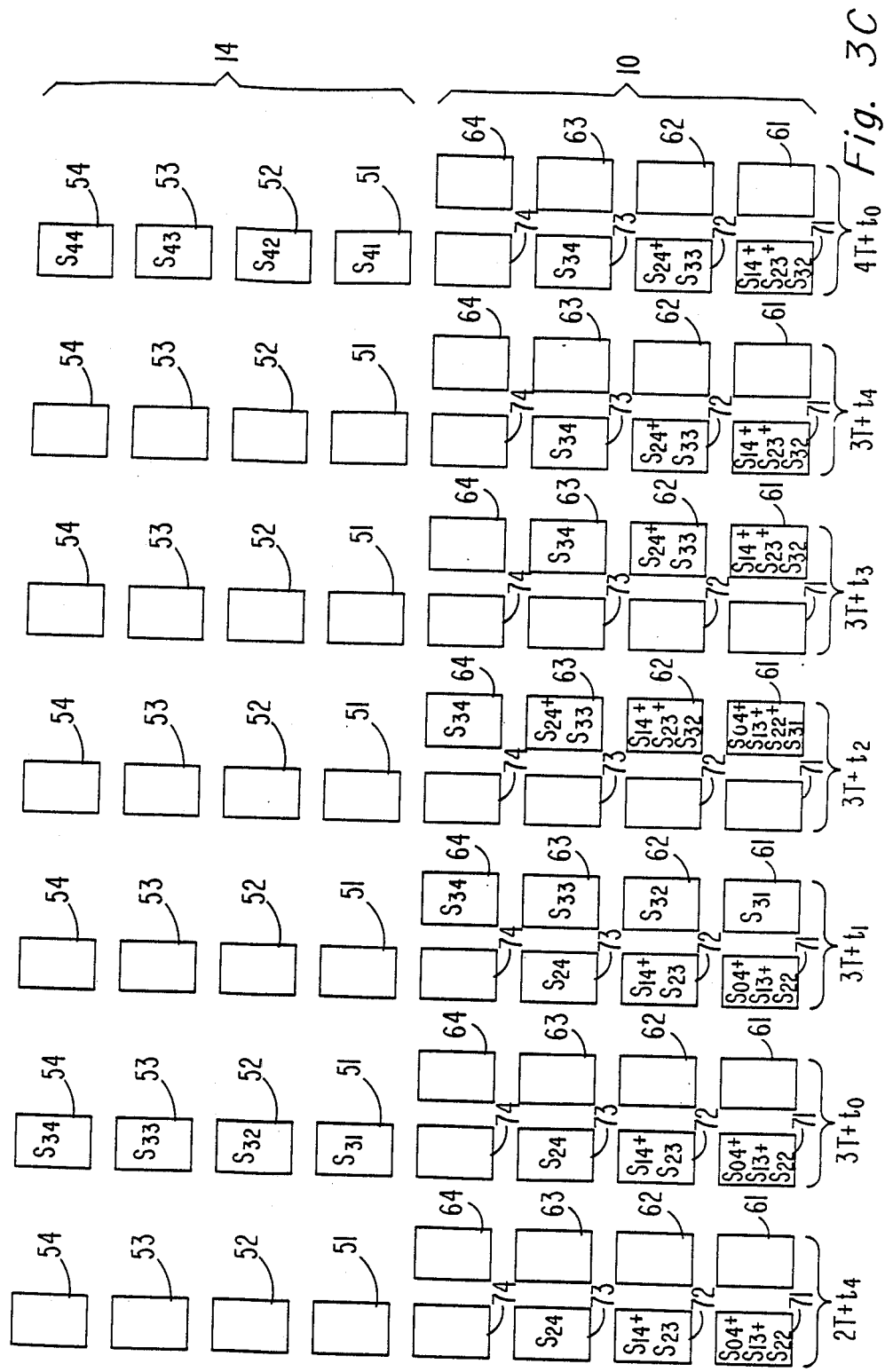

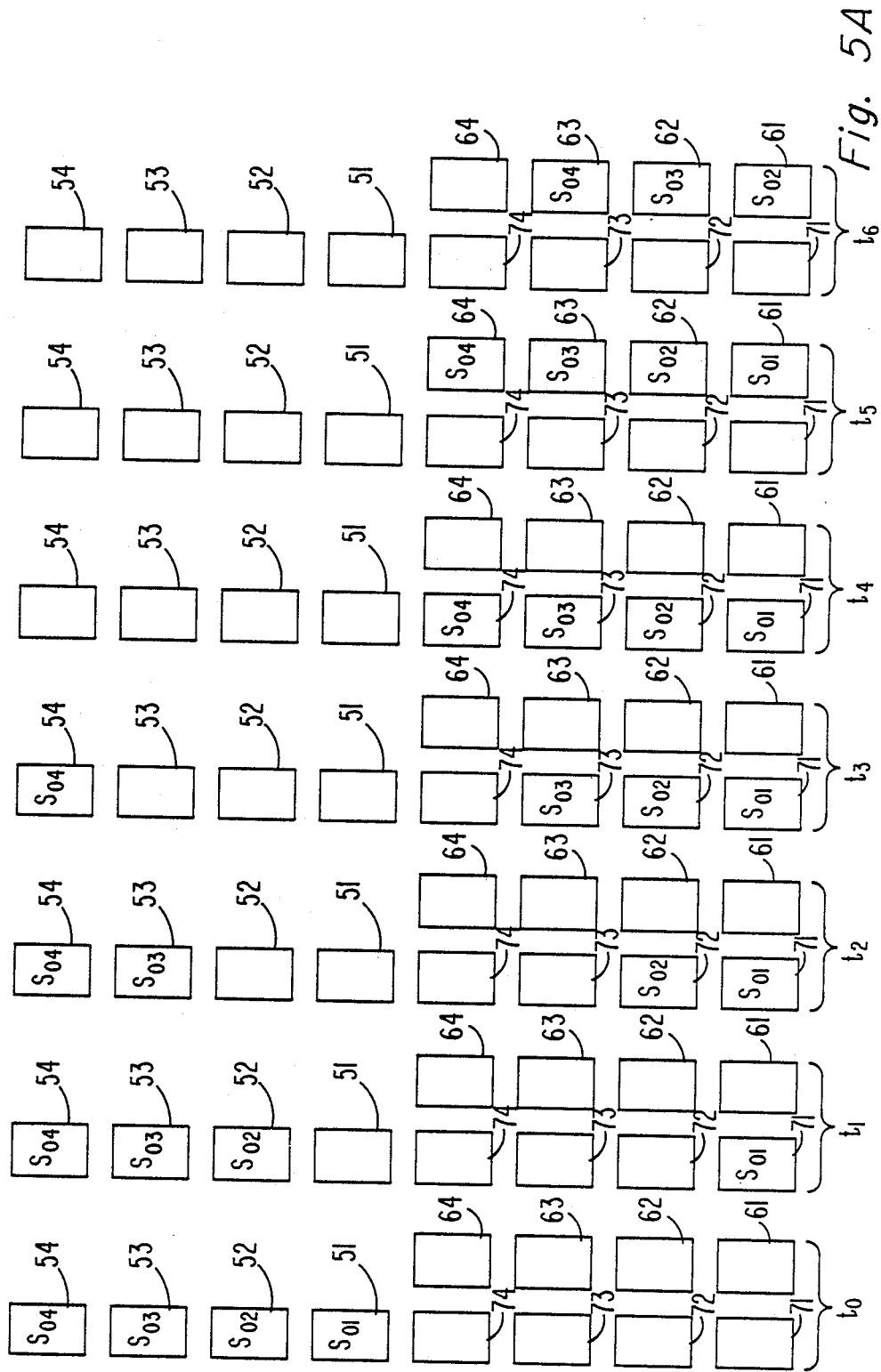

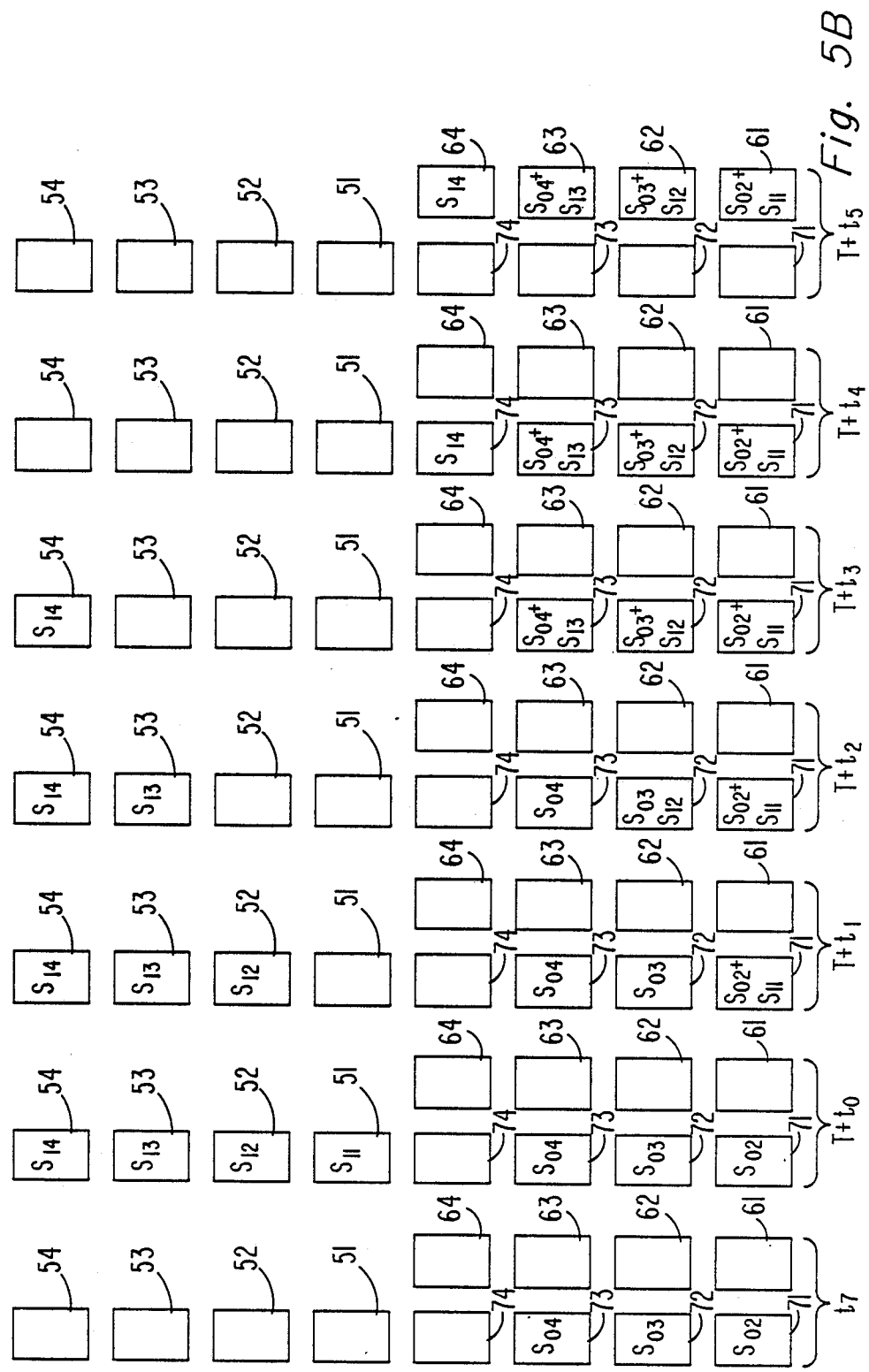

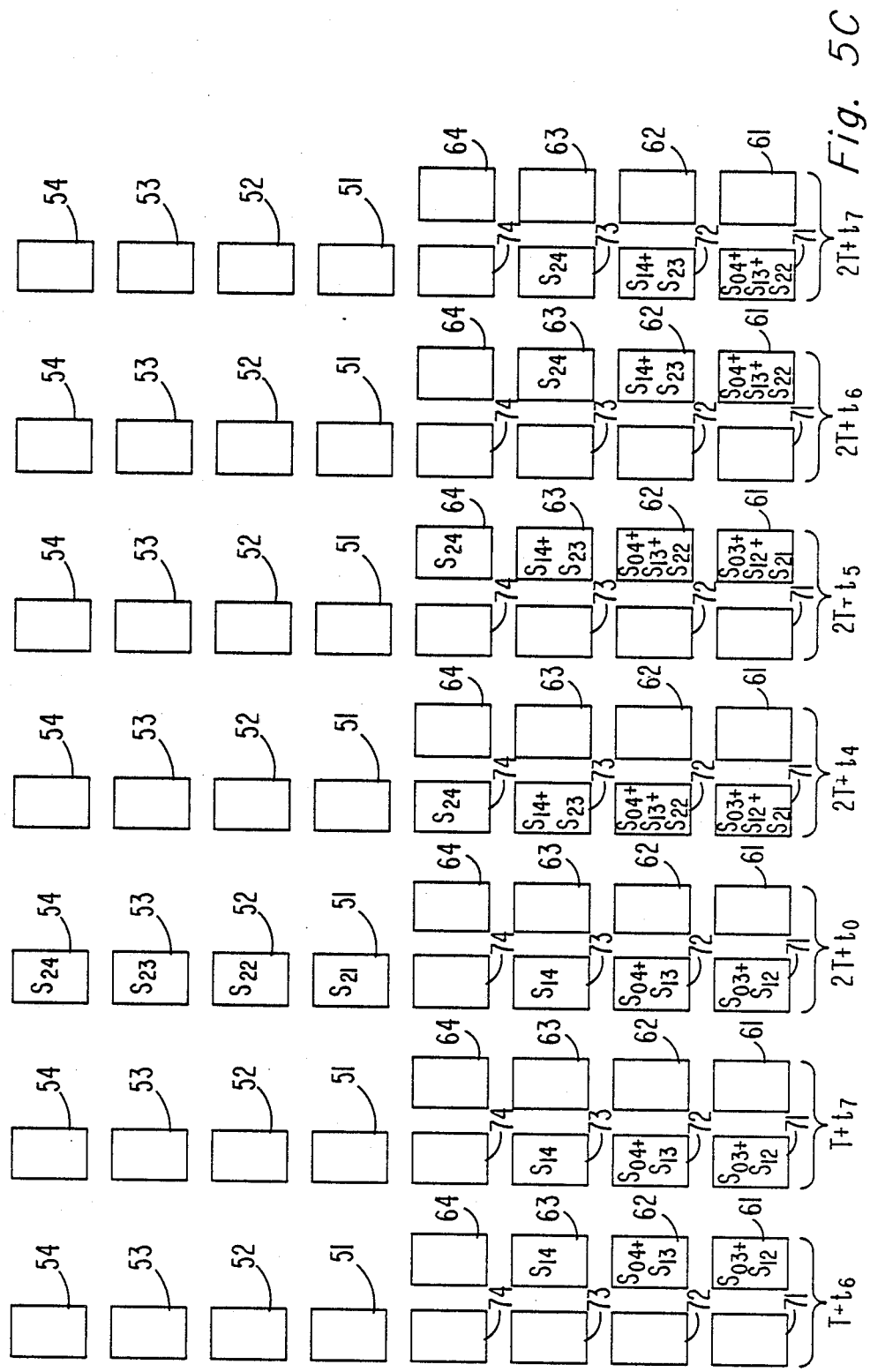

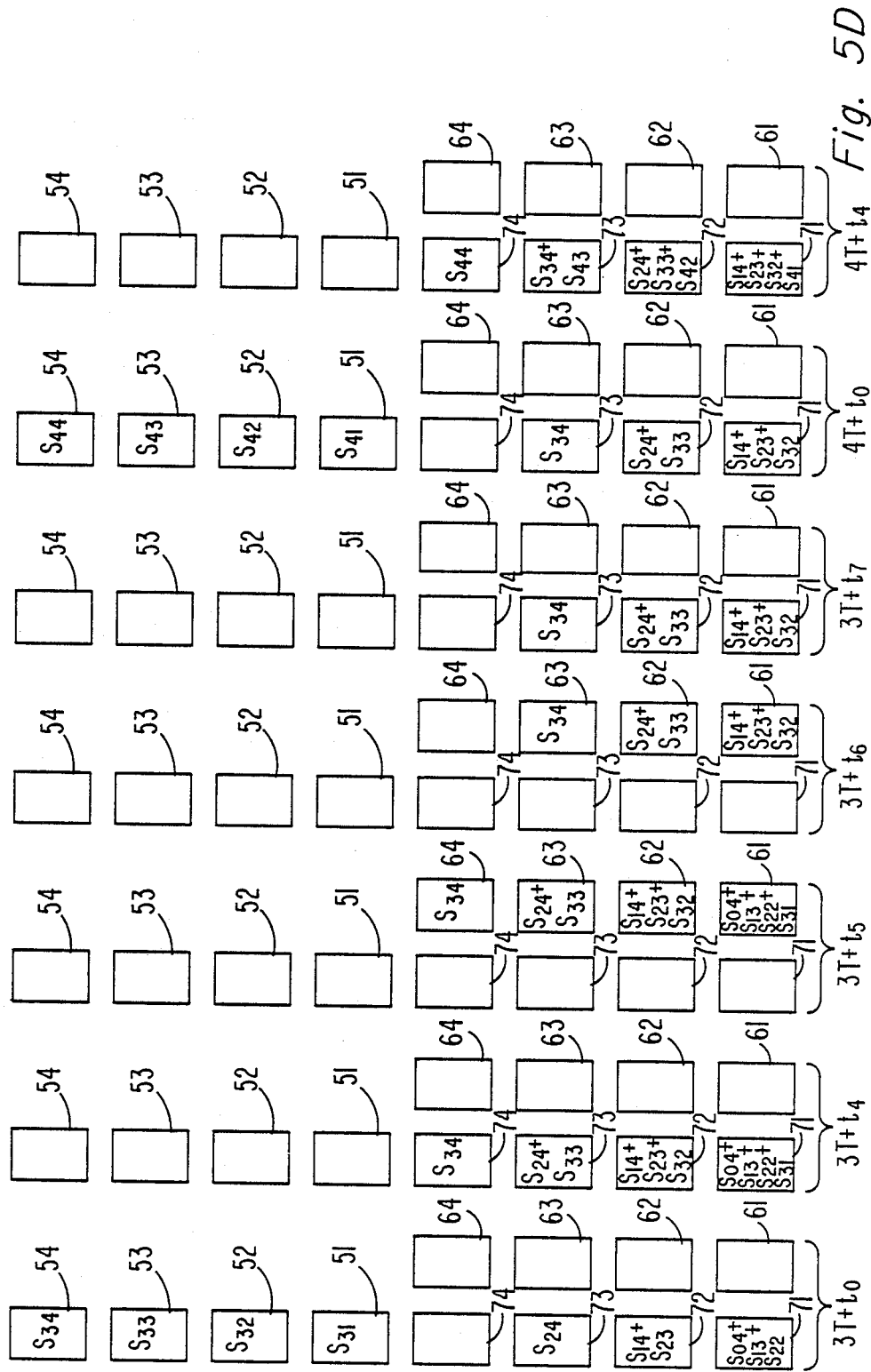

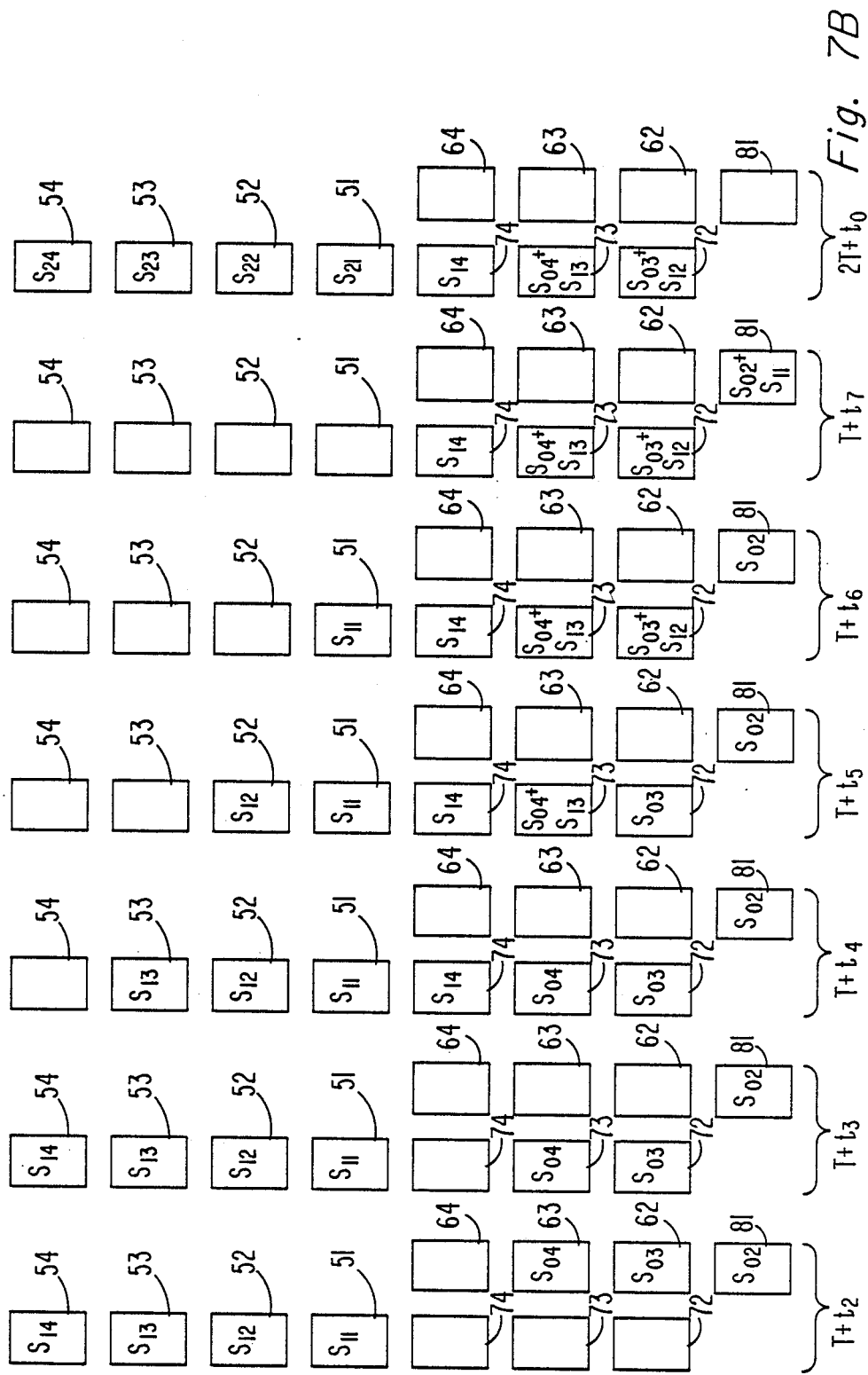

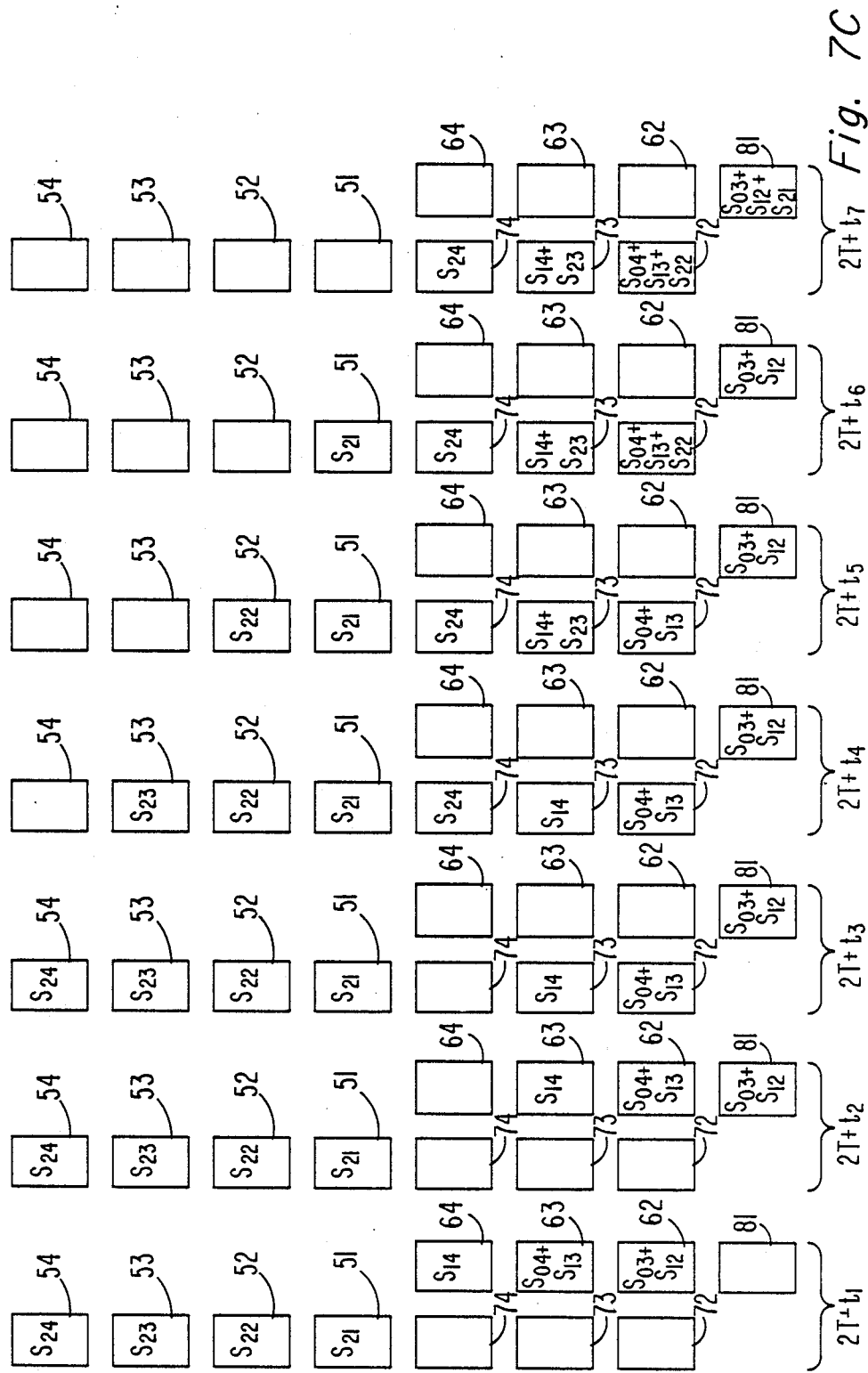

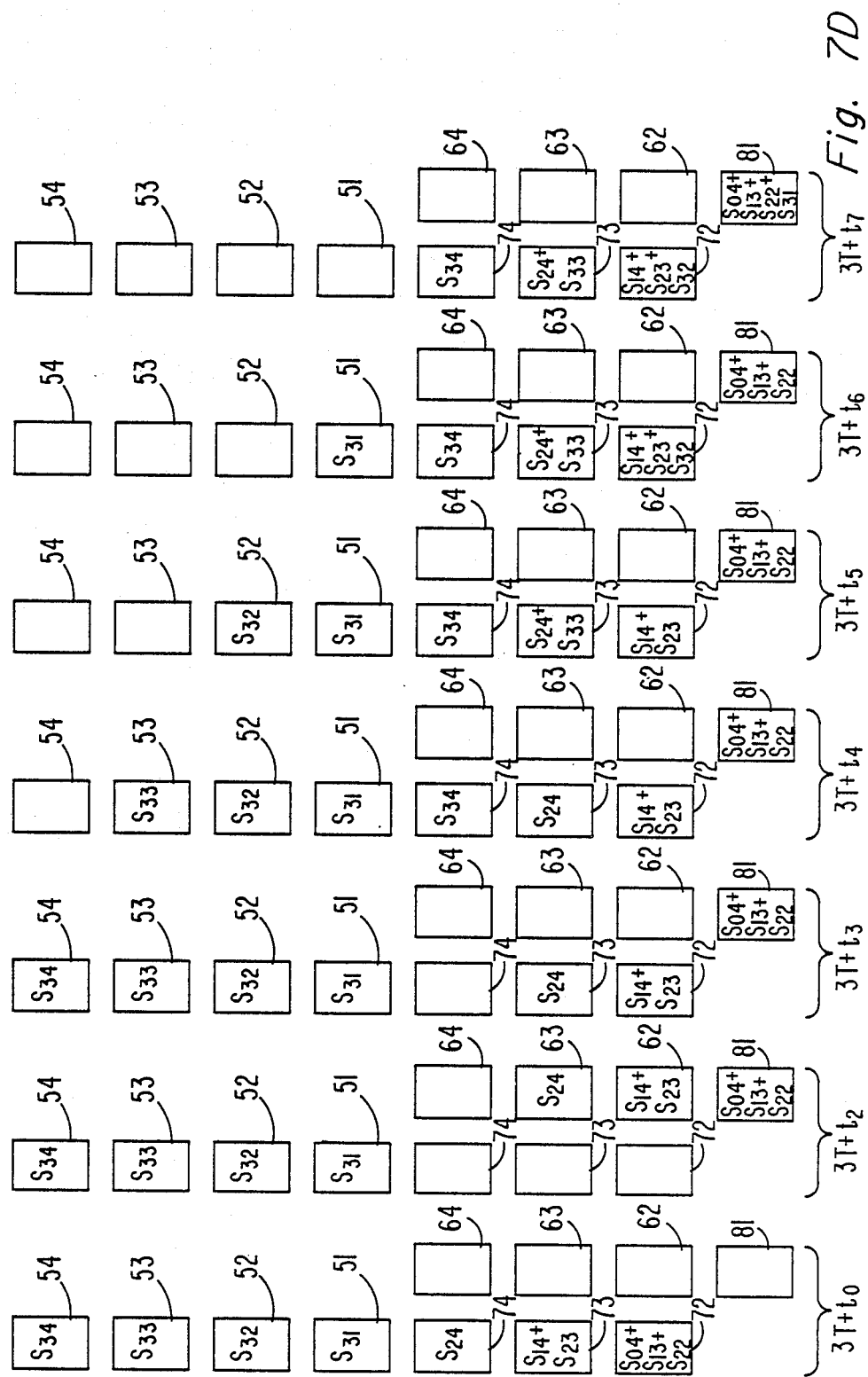

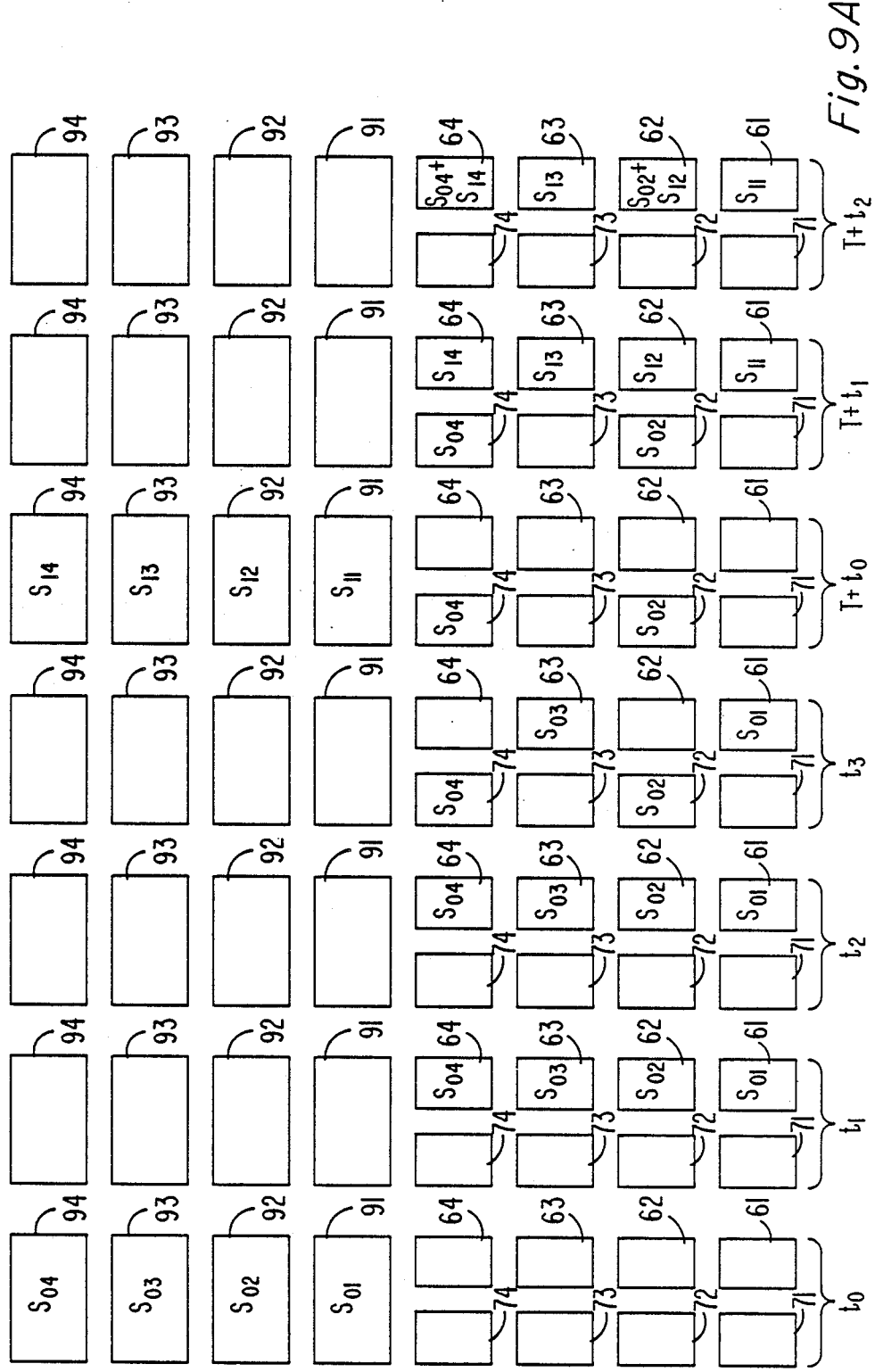

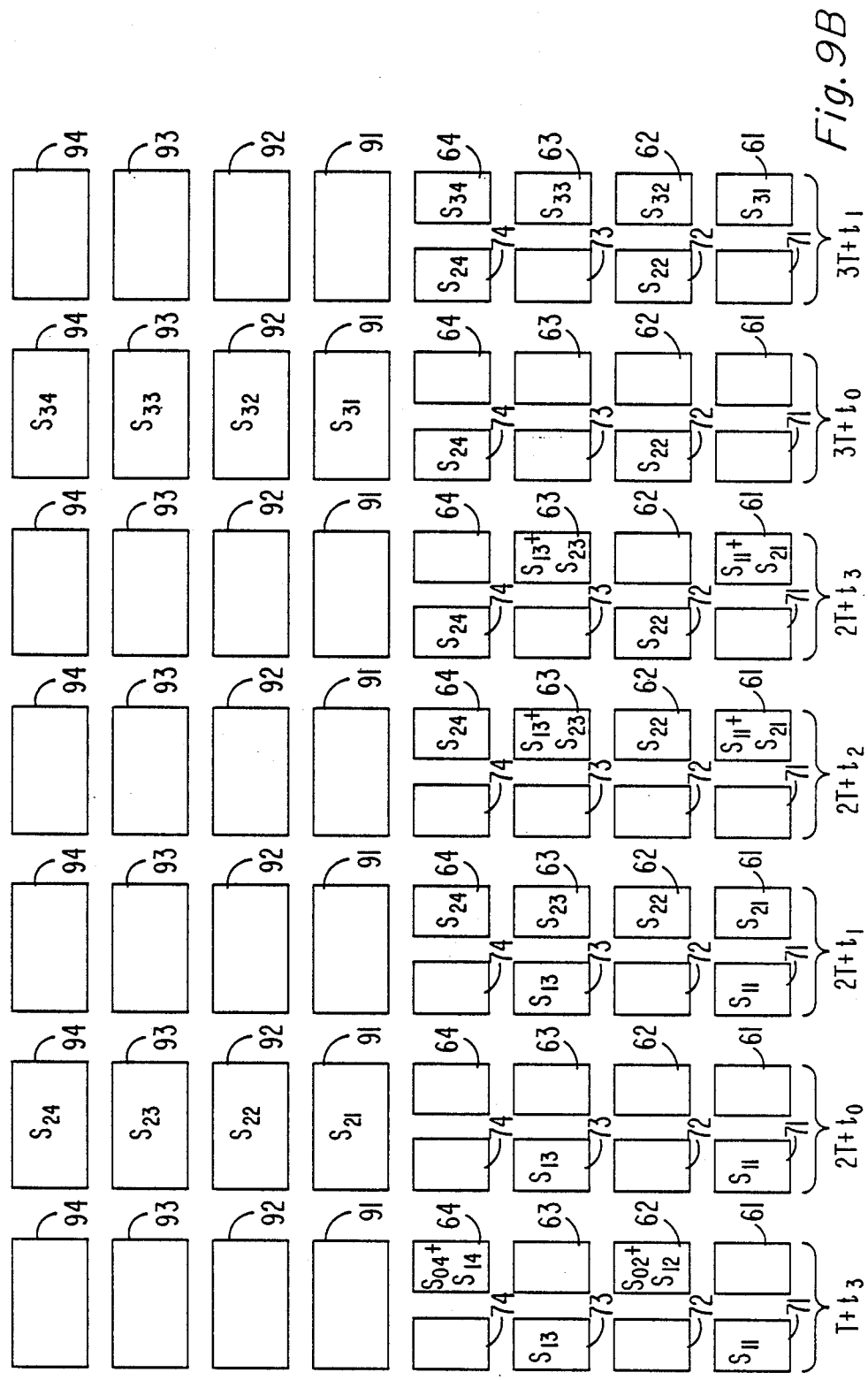

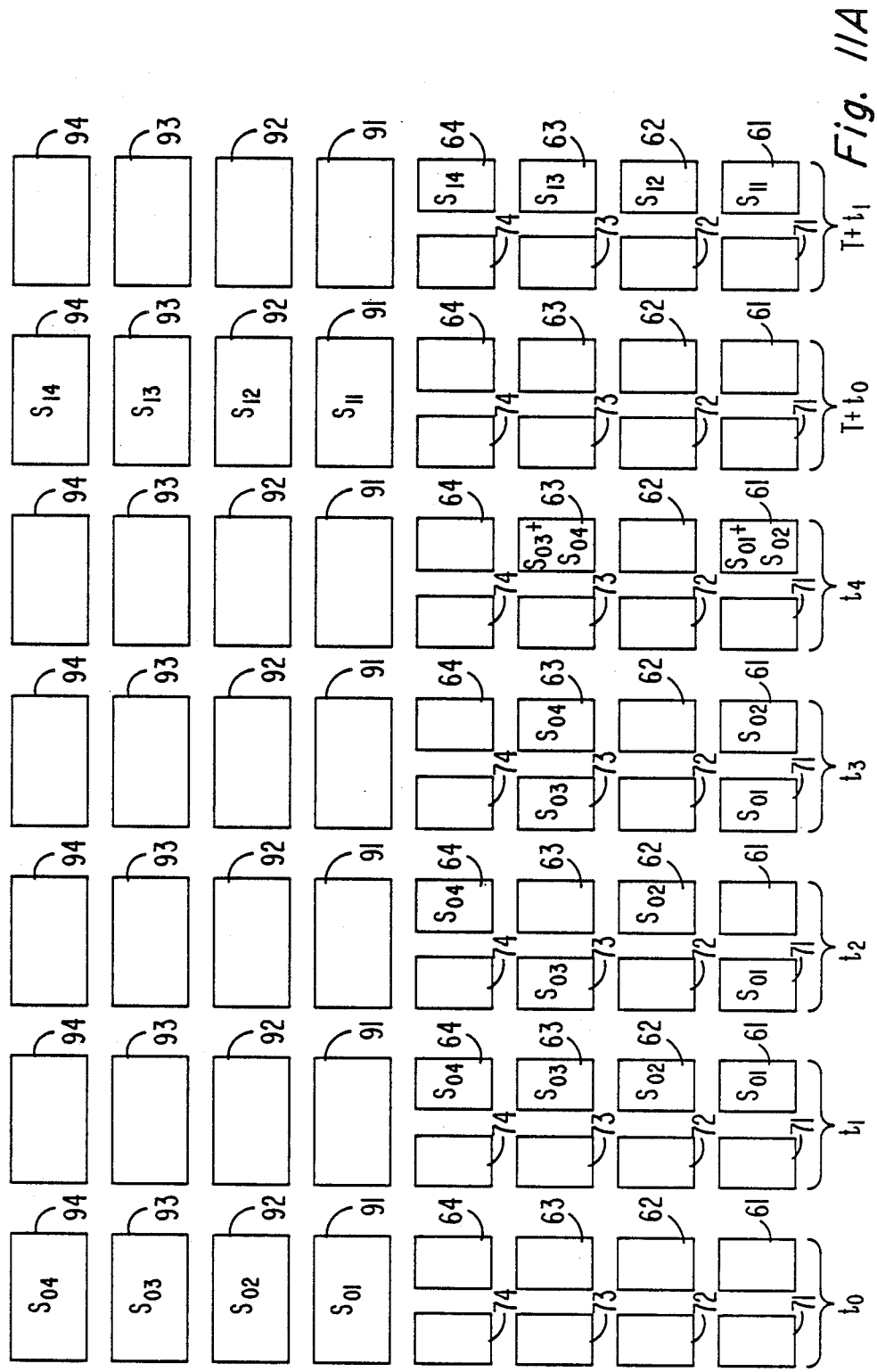

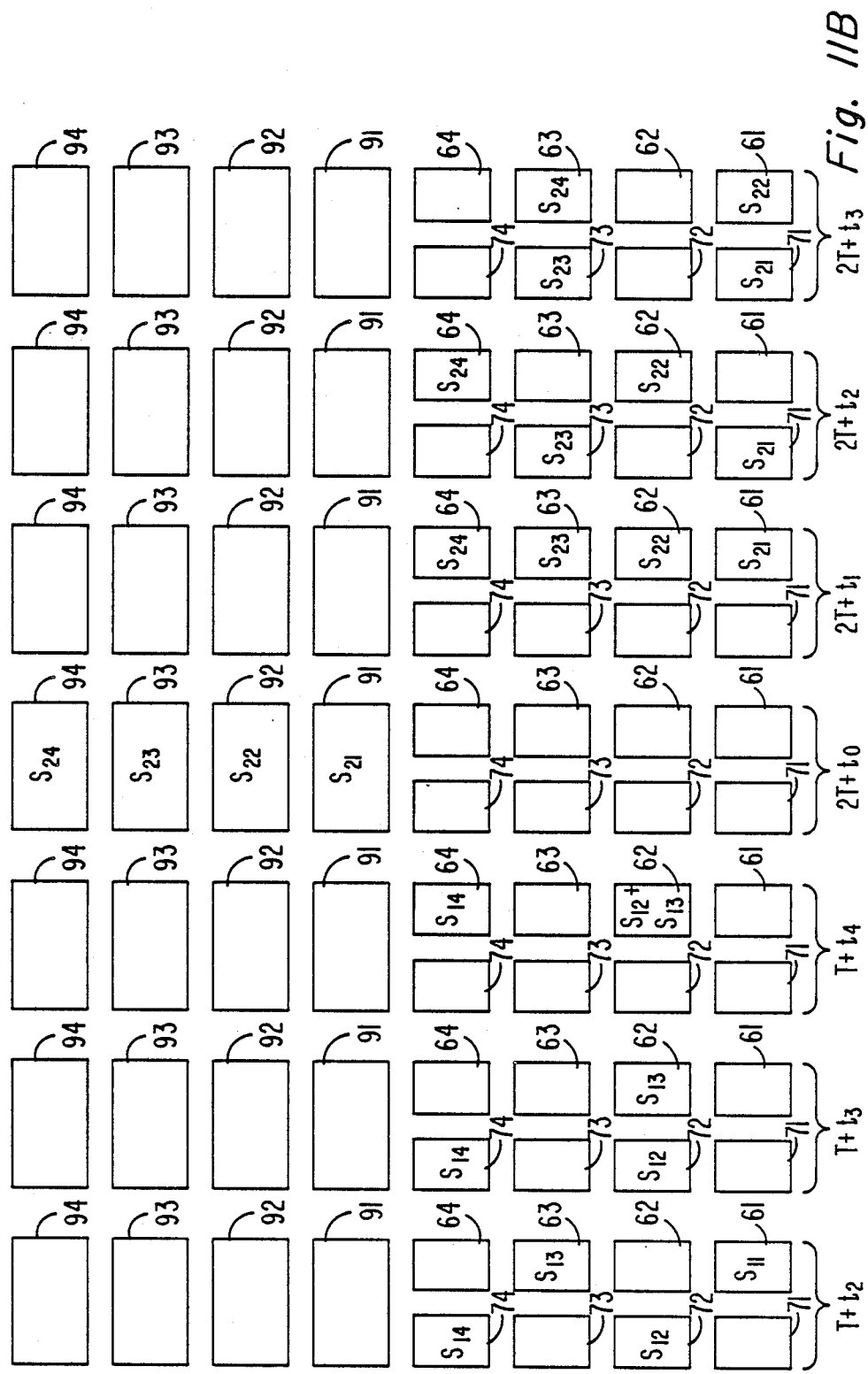

STORAGE REGISTERS WITH CHARGE PACKET ACCUMULATION CAPABILITY, AS FOR SOLID-STATE IMAGERS

This is a continuation-in-part of patent application Ser. No. 797,236 filed 12 November 1985, now abandoned.

The invention relates to storage registers for solid-state imagers, and more particularly, to ones having the novel capability of accumulating charge packets to perform image processing. In the accumulating process, a charge packet already present in a charge-storage potential-energy well is augmented by another charge packet transferred into that well, which procedure may be repeated one or more times.

BACKGROUND OF THE INVENTION

Line imagers can be operated with relative motion between the "platform" bearing them, and a field of view, to generate video signal samples that raster scan the field of view. A line imager typically comprises a line of photosensors for collecting photocharge and means for periodically carrying away the charge packets collected, then assembling them into serial format for sensing by a charge sensing circuit. The charge sensing circuit can be a floating-diffusion electrometer, for example; and the means for carrying charge packets to the electrometer can be charge-coupled device (CCD) circuitry. Line imagers may be operated to sense infrared or visible-light wavelengths.

Schottky barrier diodes formed from a metal silicide contact to silicon are favored photosensors for infrared wavelengths. This is because these photosensors can be fabricated directly on the silicon die alongside the CCD circuitry required for charge transport, with only a few additional processing steps besides those processing steps required to fabricate the CCD circuitry and the charge sensing circuitry that follows.

Photosensing for visible light, or near infrared, or both can be done with a silicon pn junction or in a potential energy well electrostatically induced in a portion of the surface of the silicon substrate apart from the CCD circuitry. When a visible-light-responsive solid-state imager is illuminated through its CCD-gate electrode-bearing surface, it is particularly desirable to do photosensing in a portion of the imager apart from the CCD circuitry. This is because the gate electrodes will interfere with obtaining proper response in the blue wavelengths, despite their being made of phototransmissive polysilicon.

Collecting photocharge for only one line scan interval in a line imager tends to provide inadequate photosensor response unless the levels of photosensor irradiation (in the wavelengths the photosensors respond to) are relatively high. In this regard line imagers tend to be less satisfactory than area imagers, where photocharge collection times tend to be longer. On the other hand, the shorter time for photocharge collection tends to make the line imager better in responding to moving objects without blurring effects. Electronic cameras which use line sensors to scan a surface of revolution in a pushbroom operation are a natural choice for aerial reconnaissance and for observations of the earth from a satellite; the line sensors are less complex to make and operate than area sensors. Where photoconversion takes place in photosensors separate from the CCD charge transfer circuitry of the sensor, better fill factors can be obtained using the line sensor.

To obtain freedom from blurring on certain types of relative motion between the imager platform and the position of the image to which the imager generates photoresponse, but to still obtain longer photocharge collection times for improved sensitivity, a mode of imager operation referred to as "time delay integration" or "TDI" is often resorted to. An area array of photosensors is employed, which photosensors are arranged in a number m rows and a number n columns. CCD charge transfer channels are interleaved with the columns of photosensors to be used as interline transfer registers, each channel having a succession of m charge transfer stages therein, which charge transfer stages may be considered to be consecutively ordinally numbered first throu $m^{th}$ in the direction of forward charge transfer. Photocharge is collected over line scan intervals and the charge packets are transferred in short register-loading intervals between line scan intervals, from each of first through $m^{th}$ rows of photosensors to a respective set of charge transfer stages of like ordinal number. This transfer is made after the previous charge packet contents of the charge transfer channels have been advanced by one charge transfer stage. The line of charge packets transferred in parallel from the output ports of the interline charge transfer channels during this one stage advance side-load the successive charge stages of an output CCD shift register, the forward clocking of which is suspended during register-load intervals. During line scan intervals the output CCD shift register is forward clocked to transfer the charge packets serially to a charge sensing stage. Inasmuch as the image elements move across the photosensor array in the direction its columns are oriented, at the same speed that the charge packets are transferred in the interleaved charge transfer channels, image integration time is lengthened. This is an auto-correlation process that improves the sensitivity of the imager for those elements. Other elements of the image are spatially low-pass filtered by time delay integration in the direction perpendicular to line scan. That is, they are blurred due to relative motion between them and the charge transfer process in the interline charge transfer channels.

(It is convenient to refer to the line scan interval and register-load interval as "line trace interval" and "line retrace interval", respectively, using the terms commonly used with regard to the kinescope displaying pictures generated from the video signal response of the CCD imager. This convention will be used throughout the rest of this disclosure.)

The insertion of interline charge transfer channels between the columns of photosensors in the photosensor array introduces larger non-photosensitive areas into the imaging area, creating a less acceptable spatial alias and lowering fill factor. "Fill factor" is the percentage of the imaging area from which photocharge can actually be collected and directly effects the photo-efficiency of the imager. The interline charge transfer channels undersirably reduce fill factor to 35% in typical prior-art line transfer CCD imagers. The loss of sensitivity in the imager due to poor fill factor is readily recovered by time delay integration, but the aliasing problem is not overcome. Further, in some imager applications it is desirable to be able to select between time delay integration and staring modes of operation, and increased sensitivity may be desired for the staring mode of operation.

A relatively new type of staring area imager is the "charge-sweep-device" or "CSD" imager. Such an imager has been described by M. Kimata et al in a paper entitled "A 480×400 Element Image Sensor With a Charge Sweep Device" appearing in pp. 100, 101 of the DIGEST OF TECHNICAL PAPERS, 1985 IEEE INTERNATIONAL SOLID-STATE CIRCUITS CONFERENCE. The interline charge transfer channels are narrowed a few times in a CSD imager, allowing fill factors of 70%, for example. Charge packets are transferred a row at a time to the interline charge transfer channels, a successive one of the rows being transferred during each line retrace interval to be clocked forward at pixel scan rate during line trace interval to accumulate under a charge storage gate crossing the ends of the interline charge transfer channel. Individual charge packet transfers need not be complete at the pixel scan rate, so the interline charge transfer channels can be narrowed at the expense of efficient charge transfer, to allow closer packing of the columns of photosensors and thus increase the fill factor. During each line retrace interval, the line of charge packets accumulated under the storage gate is side-loaded into the output CCD shift register, to be clocked forward serially to the charge sensing circuit the succeeding line trace interval. The side-loading is carried out by lowering a potential energy barrier induced in the ends of the interline charge transfer channels, by changing the voltage on an overlying storage control gate interposed between the charge storage gate and the output CCD shift register, and then changing the voltage on the storage gate to reduce the depths of the potential energy wells induced thereunder.

The CSD imager, despite its attractiveness in reducing the non-photosensitive portion of the imaging area, cannot be operated in the time-delay-integration mode to increase its sensitivity still further. This is because only one line of charge packets can be transferred into and through the interline charge transfer channels during any time. A formidable technical problem is presented, then, by the desire to combine the advantages of CSD imaging and of TDI imaging.

The present inventor proposes to solve this problem with the CSD imager by using a new type of storage register inserted between the interline charge transfer channels and the output CCD shift register. This new type of storage register has the capability of accumulating successive charge packets supplied to it, which capability can be utilized to perform time-delay-integration.

This new type of storage register can also be used to perform other useful image processing functions. For example, this new type of storage register can be used as a temporary frame storage register to provide true line interlace between alternate field scans in a frame-transfer type of imager. Prior art frame-transfer imagers are only capable of providing psuedo line interlace from field to field.

SUMMARY OF THE INVENTION

Parallel CCD charge transfer channels are used in new types of storage register to connect a plurality of parallel, respective input ports to a plurality of parallel, respective output ports. In one of the new types of storage register embodying the invention, the charge transfer stages in each of the parallel CCD charge transfer channels are selectively gated to respective charge storage sites alongside the charge transfer channel, to implement charge sloshing back and forth between each charge storage site and its respective charge transfer stage in a CCD charge transfer channel. In another of the new types of storage register, the respective charge transfer stages in each of the parallel CCD charge transfer channels are selectively gated to respective charge storage sites along the charge transfer channel through one set of transfer gates, thereafter to be selectively gated through a second set of transfer gates back into respective charge transfer stages in that charge transfer channel.

BRIEF DESCRIPTION OF THE DRAWING

FIGS. 2A-D are a set of timing diagrams for an imager of the type shown in FIG. 1, for illustrating one method of carrying out time-delay-integration in the CCD storage register.

FIGS. 3A-C are another set of timing diagrams for an imager of the type shown in FIG. 1, for illustrating another method of carrying out time-delay-integration in the CCD storage register.

FIGS. 5A-D are a set of timing diagrams for an imager of the type shown in FIG. 4, for illustrating one method of carrying out time-delay-integration therein.

FIGS. 7A-D are a set of timing diagrams for an imager of the type shown in FIG. 6, for illustrating a method of carrying out time-delay-integration therein.

FIGS. 9A and 9B are a set of timing diagrams for an imager of the type shown in FIG. 8, for illustrating one method of achieving line interlace.

FIGS. 11A and 11B are a set of timing diagrams for an imager of the type shown in FIG. 8, illustrating how psuedo line interlace can be provided by such an imager.

DETAILED DESCRIPTION

Figure 1:
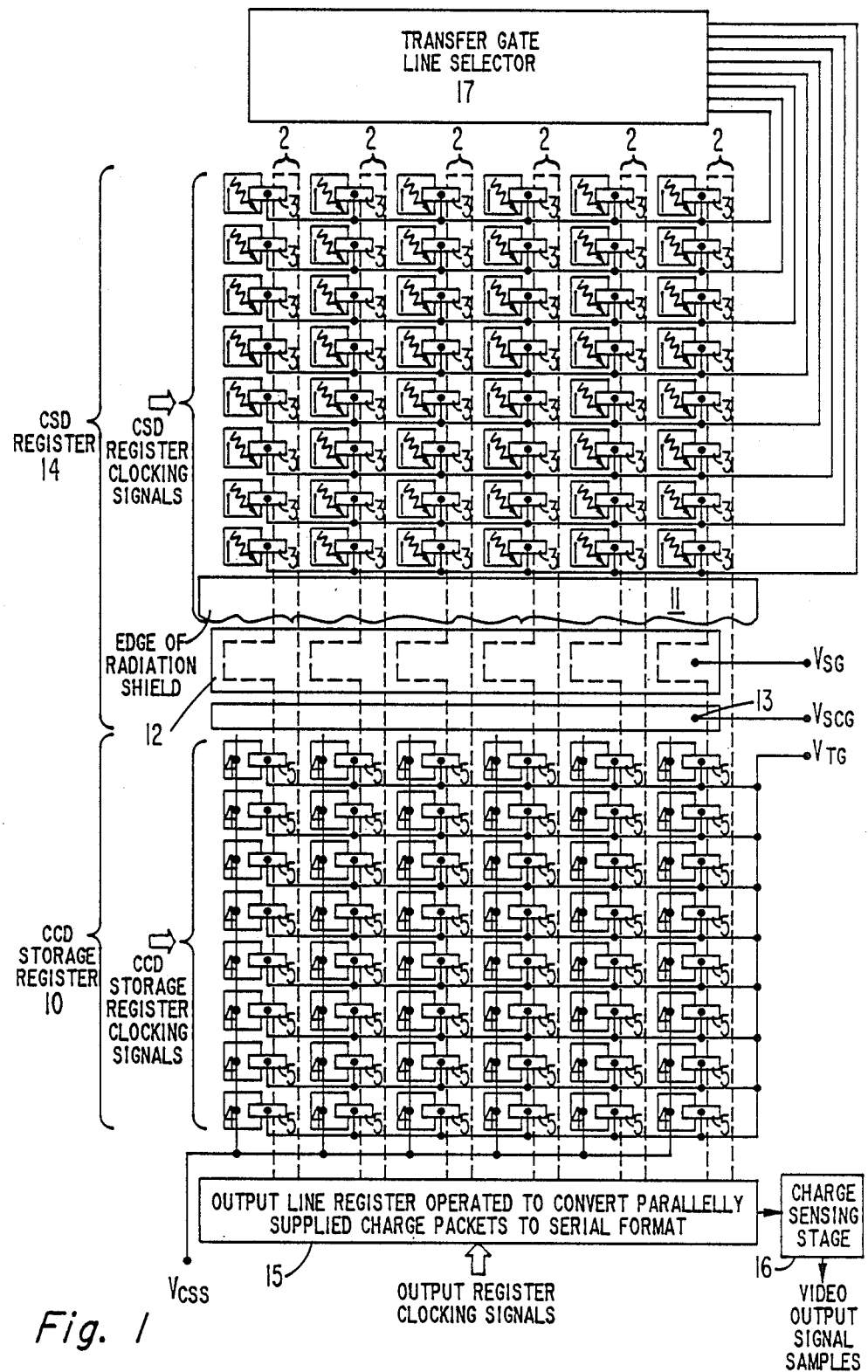
FIG. 1 is a block schematic diagram of an infrared line imager embodying the invention. The imager uses a CSD image register with Schottky-barrier diode photosensors, and it uses a CCD storage register with time-delay-integration capability between its image register and output CCD shift register.

In FIG. 1 a charge-sweep-device solid-state imager is modified to include a CCD storage register 10 in which time-delay-integration is performed in accordance with the invention. CCD storage register 10 is recurrently parallelly loaded with respective lines of charge packets. Each line of charge packets is clocked forward from charge storage wells induced in buried CCD charge transfer channels 2 under a storage gate electrode 12, when the voltage $V_{SG}$ applied to electrode 12 is pulsed negatively from its normal relatively positive value to reduce the depth of the charge storage wells, and when also the voltage $V_{SCG}$ applied to a succeeding storage control gate electrode 13 is pulsed positively from its normal relatively negative value to lower the charge transfer barrier normally induced under electrode 13.

CCD storage register 10 recurrently side-loads with respective charge packets the successive charge transfer stages of a CCD output line register 15. Each line of charge packets loaded from CCD storage register 10 is a time-delay-integration response to a plurality of the lines of charge packets previously clocked forward into register 10. After being parallelly loaded with a line of charge packets, the output line register 15 is operated as a CCD shift register to transfer the charge packets serially to a charge sensing stage 16 for conversion to respective samples of video output signal.

The CCD storage register 10 and CCD output line register 15 are usually covered by a radiation shield 11, a cutaway portion of which is shown in FIG. 1. This radiation shield 11 also extends over the storage-control and storage gate electrodes 12, 13 of CSD register 14. If the radiation to which the FIG. 1 imager is exposed is long enough in wavelength to be beyond the band of wavelengths to which silicon is photosensitive, radiation shield 11 need not be provided.

In the charge-sweep-device register 14 of the FIG. 1 imager, preceding CCD storage register 10, photosensors 1 are arrayed by row and by column. Photosensors may be visible-light responsive, infrared responsive, or both. (Each box representative of one of the photosensors 1 includes a wavy arrow representative of impinging radiation as well as the identification numeral 1 in its lower left corner.) A respective one of the buried CCD charge transfer channels 2, shown in dashed outline, parallels each column of photosensors 1 and comprises a succession of charge transfer stages corresponding to respective ones of the photosensors in the column the charge transfer channel 2 parallels. A respective transfer gate electrode 3 provides for selective connection of each photosensor 1 and its corresponding charge transfer stage in column CCD charge transfer channel 2. These selective connections may be surface-channel or buried-channel. The transfer gate electrodes 3 in each row connect in common to a respective bus to which a line selection signal is selectively applied by a transfer gate line selector 17.

Gate electrodes cross CCD charge transfer channels 2 and are receptive of CSD register clocking signals to cause the transfer of charge packets down the channels. Such conventional gate electrodes are not specifically shown in FIG. 1, to avoid cluttering the drawing. These gate electrodes cross the array of charge transfer channels from left to right, generally speaking, with different gate electrodes in each pitch sequence normally being made into a respective polysilicon layer, separated from the other polysilicon layers and the substrate surface by electrically insulative oxide layers. These gate electrodes are spread out in normal gate electrode pitch sequences over the charge transfer channels, but are arranged in a stack or sandwich structure to squeeze between the adjacent-row photosensors in each intervening column of photosensors 1. The transfer gate electrodes 3 may be integral with gate electrodes of one phase, as in the Kimata et alia CSD imager design, with transfer being controlled by transfer pulses superposed on normal forward clocking voltages for the CCDs comprising charge transfer channels 2. (If this is done, transfer gate line selector 17 will use tri-state bus drivers and CCD register 14 clocking signals will be supplied from another set of tri-state bus drivers.) Alternatively, transfer gate electrode voltages may be separately bussed to rows of transfer gate electrodes 3 from transfer gate line selector 17.

Transfer gate line selector 17 steps through a cycle of line selection steps at intermittent time intervals time T apart. The time duration of integration in each of the photosensors 1 is essentially T. Transfer gate line selector 17 conditions one of the rows of gate electrodes 3 at a time to allow transfer of charge under them. So photocharge packets collected in the photosensors 1 are selectively transferred by row through charge transfer channels 2 to be collected in respective potential energy wells induced at the ends of those channels 2 under the overlying storage gate electrode 12, then receptive of voltge $V_{SG}$ having its normal relatively positive value. The CSD register 14 charge transfer channels are generally made as narrow as possible and receive CSD register clocking signals of such high rate that charge from the selected row of photosensors 1 usually is transferred by a successive scooping or "charge sweep" process. The collected photocharge from each photosensor is transferred in a succession of charge packets to be collected and re-integrated to a single charge packet in a potential-energy well induced under storage gate electrode 12.

Each line of charge packets collected in those wells under storage gate electrode 12 is then clocked forward into CCD storage register 10 at a lower clock rate than CSD register clocking. This lower clock rate is the rate at which transfer gate line selector 17 makes its successive line selections. This clock rate forward into CCD storage register 10 is still high, however, in comparison to the rate 1/T at which each successive line of charge packets is completely clocked out of output line register 15 to charge sensing stage 16. So the lines of charge transferred out of CSD register 14 into CCD storage register 10 during one of the intermittent cycles of line selection can be considered to be essentially parallel in time.

In the CCD storage register 10 there are extensions of charge transfer channels 2 from charge-sweep-device register 14 to respective charge transfer stages in CCD output line register 15. Each extension of charge transfer channels 2 parallels a respective column of charge storage sites 4 and has a number of charge transfer stages corresponding to respective ones of these adjacently located charge storge sites. A respective transfer gate electrode 5 provides for selective connection of each storage site 4 and its corresponding charge transfer stage in one of the charge tranfer channels 2 extension. These selective connections may be surface-channel or buried-channel. The transfer gate electrodes 5 are connected in common busing to receive a voltage $V_{TG}$ which is normally negative respective to substrate bias potential. So transfer gate electrodes 5 normally have potential energy barriers to charge transfer induced under them. Transfer gate electrodes 5 when pulsed relatively positive compared to their normal negative level can enable charge transfer from each charge transfer stage in the extensions of charge transfer channels 2 (into CCD storage register 10) to a corresponding charge storage site 4, or vice versa, depending on the electrostatic potentials in the charge transfer stage and its corresponding charge storage site 4. Construction of transfer gate electrode 5 is analogous to construction of transfer gate electrodes 3, and their respective operations have similarities.

Charge storage sites 4 are shown induced under individual, little, square gate electrodes connected in common busing to receive a voltge $V_{CSS}$, relatively positive during charge transfer into the sites 4 or during charge storage, and relatively negative during charge transfer from the sites 4. In actual practice it is easier to induce the charge storage sites 4 with a sheet electrode in top metalization receptive of $V_{CSS}$, defining their boundaries with channel stop diffusions into the imager substrate except where defined by transfer gate electrodes 5.

It may be desirable to provide anti-blooming structure in CCD storage register 10 to prevent blooming that might otherwise arise because of the summed charge packets exceeding the charge storage capacities in CCD register 10. Because of the charge sweep operation of CSD register 14 it is difficult to prevent blooming under all conditions just by using overflow drains with each of the photosensors 1.

The timing diagrams of FIGS. 2A-D are referred to to understand one way that pulsing of $V_{SG}$, $V_{SCG}$ and $V_{CSSS}$ can cooperate with transfer gate line selector 17 to carry out time-delay-integration in the FIG. 1 imager. The timing diagrams in this specification concern operation of one extended charge transfer channel 2, the corresponding charge storage sites and the associated photosensors. The eight-row registers of FIG. 1 would require timing diagrams of such complexity as to be difficult to draw and to understand, so four-row registers of a simpler imager will be considered in the timing diagrams. However, for convenience, the parts corresponding to those of the FIG. 1 imager will continue to be referred by the same identification numbers used in FIG. 1. In FIGS. 2A-D the boxes 51, 52, 52, 54 represent a column of photosensors in the CSD register 14.

The boxes representative of the charge transfer stages in the CSD register to which the photosensors 51-54 transfer charge are omitted from the FIGS. 2A-D representations, since it is the time-delay-integration process, not the charge-sweep-device process, that here is of particular concern. The boxes 61-64 represent charge transfer stages in the extensions of the CSD register charge transfer channels 2, those which extend into the CCD storage register 10; and boxes 71-74 represent the charge storage sites corresponding to the charge transfer stages 61-64, respectively.

Operation will be described with respect to the representative column structure of the FIG. 1 imager. Such operation parallels, in time, similar operations in the other column structures of the FIG. 1 imager.

Figure 2A:
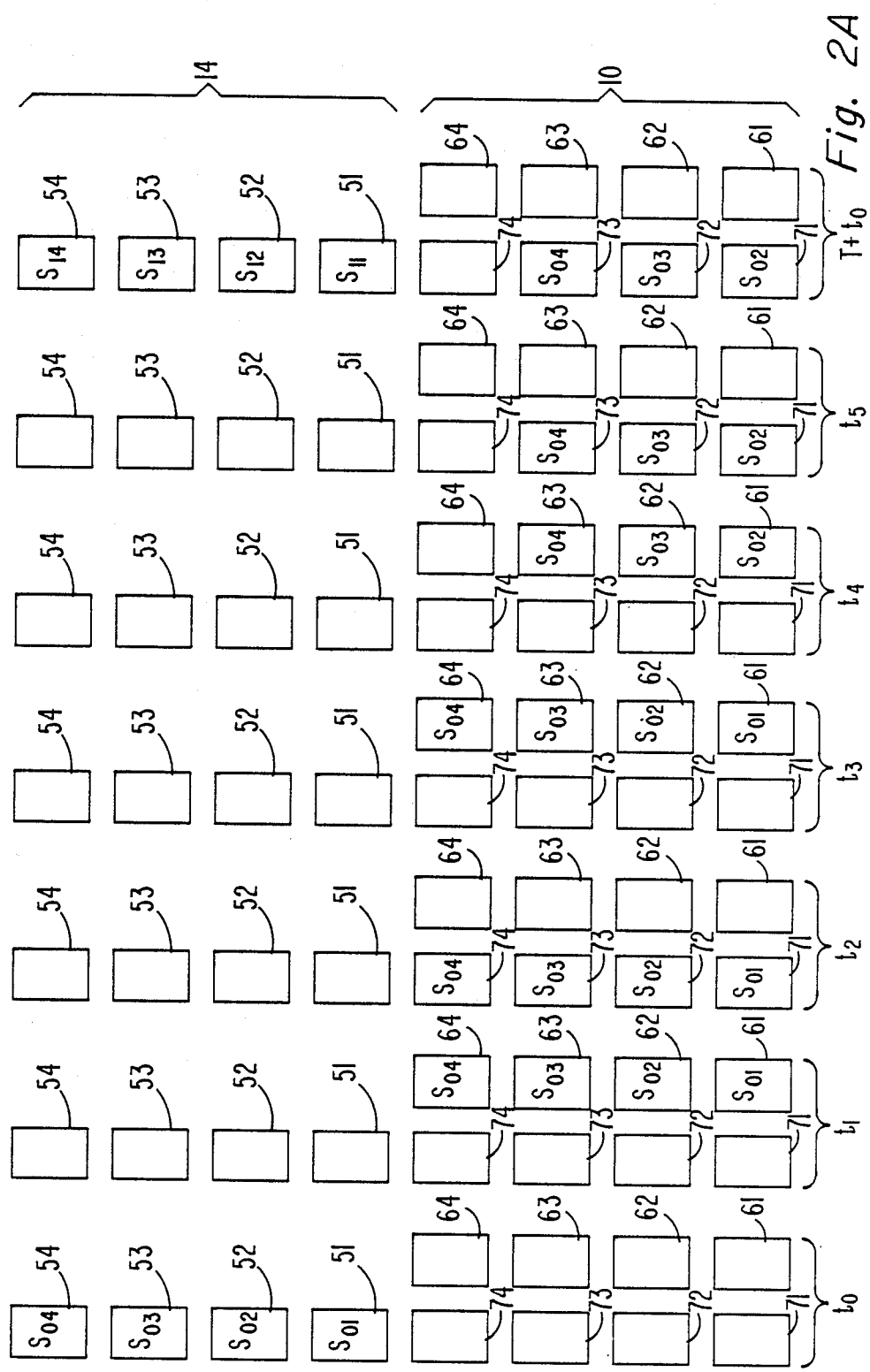

At time $t_0$ in FIG. 2A the samples $S_{01}$, $S_{02}$, $S_{03}$ and $S_{04}$ descriptive of a column of image elements, have accumulated as charge packets over a preceding image integration interval of duration T. In denominating individual charge packets that are samples of image elements, the letter S followed by a two-digit subscript will be used. The first digit of the subscript indicates the ordinal number of the respective integration interval of length T, which intervals are consecutively numbered. The second digit of the subscript is the same as the last digit of the identification numeral of the one of the photosensors 51, 52, 53 or 54 in which the charge packet was originally accumulated. The times $t_1$, $t_2$, $t_3$, $t_4$, and $t_5$ follow time $t_0$ in close succession at intervals substantially shorter than T.

Between times $t_0$ and $t_1$, CSD operation takes place in the CSD register 14 of which photosensors 51, 52, 53 and 54 are a part. The CSD operation is as follows. The transmission gates 3 connecting the first row of photosensors (of which 51 is one) are rendered transmissive, and charge packets from the first row of photosensors 1 are swept out into the charge transfer channels 2 to accumulate as a first line of charge packets under the storage gate electrode 12 at the end of the the CSD register. Then, after appropriate pulsing of the storage gate electrode 12 and its following storage control gate electrode 13, this first line of charge packets is clocked forward into the CCD storage register 10, to its fourth row including charge transfer stage 64. The transmission gates 3 connecting the second row of photosensors (of which 52 is one) are then rendered transmissive, and charge packets from the second row of photosensors 1 are swept out into the charge transfer channels 2 to accumulate as a second line of charge packets under the storage gate electrode 12. Then, this second line of charge packets is clocked forward into the CCD storage register 10, to its fourth row including charge transfer stage 64. Simultaneously, the charge packets originating in the first row of photosensors 1 are clocked forward into the third row of CCD storage register 10 including charge transfer stage 63. The transmission gates 3 connecting the third row of photosensors (of which 53 is one) are then rendered transmissive, and charge packets from the third row of photosensors 1 are swept out into the charge transfer channels 2 to accumulate as a third line of charge packets under the storage gate electrode 12. Then, this third line of charge packets is clocked forward into the CCD storage register 10, to its fourth row including charge transfer stage 61. Simultaneously, the charge packets previously in the fourth and third rows of CCD storage register 10 are transferred to positions in its third and second rows, respectively. The transmission gates 3 connecting the fourth row of photosensors (of which 54 is one) are then rendered transmissive, and charge packets from the fourth row of photosensors 1 are swept out into the charge transfer channels to accumulate as a fourth line of charge packets under the storage gate electrode 12. Then, this fourth line of charge packets is clocked forward into the CCD storage register 10, to its fourth row including charge transfer stage 64. Simultaneously, the charge packets originating in the third, second, and first rows of photosensors are transferred to positions in the third, second, and first rows of CCD storage register 10. These CSD operations take place in a relatively short period of time so the samples with the same first digit in their subscript are, practically speaking, obtained contemporaneously.

At time $t_1$ the charge packets $S_{01}$, $S_{02}$, $S_{03}$, and $S_{04}$ repose in charge transfer stages 61, 62, 63, and 64 respectively. A charge sloshing operation, sloshing charge packets from the charge transfer stages 61-64 etc. into their corresponding charge storage sites 71-74 etc. to merge with any charge packets therein and back to charge transfer stages 61-64, is carried out between times $t_1$ and $t_3$.

Between times $t_1$ and $t_2$, in a first part of the charge-sloshing operations, the charge packet contents of charge transfer stages 61, 62, 63 and 64 are shifted into the corresponding charge storage sites 71, 72, 73 and 74. In this instance there are presumed not to be previously stored charge packets in charge storage sites 71, 72, 73, 74 (as might be the case after a cap-up of the camera when image radiation is not permitted to reach the imager). Where there are previously stored charge packets, the newly admitted charge packets will merge with them to perform a set of sample addition steps parallel-in-time. This shift operation is carried out both by pulsing $V_{CCS}$ positively to render the charge storage sites 4 positive with respect to the charge transfer channels 2, and by pulsing the voltage $V_{TG}$ applied to the transmission gate electrodes 5 relatively positive compared to normal condition, to lower the potential energy barriers to charge transfer normally induced under the gate electrodes 5.

Between times $t_2$ and $t_3$ the charge packet contents of charge storage sites 71, 72, 73 and 74 are shifted into the corresponding charge transfer stages 61, 62, 63 and 64 in a second part of the charge sloshing operation. This shift operation is carried out by pulsing $V_{CSS}$ negatively to render the charge storage sites 4 negative with respect to the charge transfer channels 2, while still pulsing the transmission gate electrodes 5 to lower the potential energy barriers to charge transfer normally induced under them. After time $t_3$ the storage register 10 is forward clocked one cycle to advance by one charge transfer stage each of the charge packets in the charge transfer channel 2 extensions. In FIG. 2A this clocks $S_{01}$ charge packet out of storage register 10 (to side-load one of the charge transfer stages of output line register 15); and it advances the $S_{02}$, $S_{03}$, and $S_{04}$ charge packets to charge transfer stages 61, 62 and 63, respectively, giving rise to the conditions shown for time $t_4$.

Between times $t_4$ and $t_5$ the charge packets in charge transfer stages 61-64 are shifted back to the corresponding charge storage sites 71-74. Then, over an ensuing time interval of duration T a new set of charge packets $S_{11}$, $S_{12}$, $S_{13}$, and $S_{14}$ are accumulated in photosensors 51, 52, 53, and 54, respectively.

The same set of charge packets sampling image operations described with respect to $S_{01}$, $S_{02}$, $S_{03}$, and $S_{04}$ elements as taking place between each of the successive times $t_0$, $t_1$, $t_2$, $t_3$, $t_4$ and $t_5$ are repeated with respect to $S_{11}$, $S_{12}$, $S_{13}$, and $S_{14}$ charge packets between each of the successive times $T+T_0$, $T+t_1$, $T+t_2$, $T+t_3$, $T+t_4$, and $T+t_5$ (FIG. 2B). These operations are repeated at intervals T later for each successive set of charge packets sampling image elements.

In modulo-T time, then, these steps are as follows:

at time $t_0$ to $t_1$, charge sweep and forward clock operations are used to move charge packets descriptive of image samples into storage register charge transfer channel extensions;

between times $t_1$ and $t_2$, charge packets are shifted from charge transfer stages to corresponding charge storage sites;

between times $t_2$ and $t_3$, charge packets are shifted from charge storage sites to corresponding charge transfer stages;

between times t and $t_4$, each charge packet is advanced one charge transfer stage in the charge transfer channel 2 extension;

between times $t_4$ and $t_5$, charge packets are transferred from charge transfer stages to corresponding charge storage sites. (The step between modulo-T times $t_4$ and $t_5$ can be deferred for a length of time nearly equal to T, if desired).

Figure 2C:
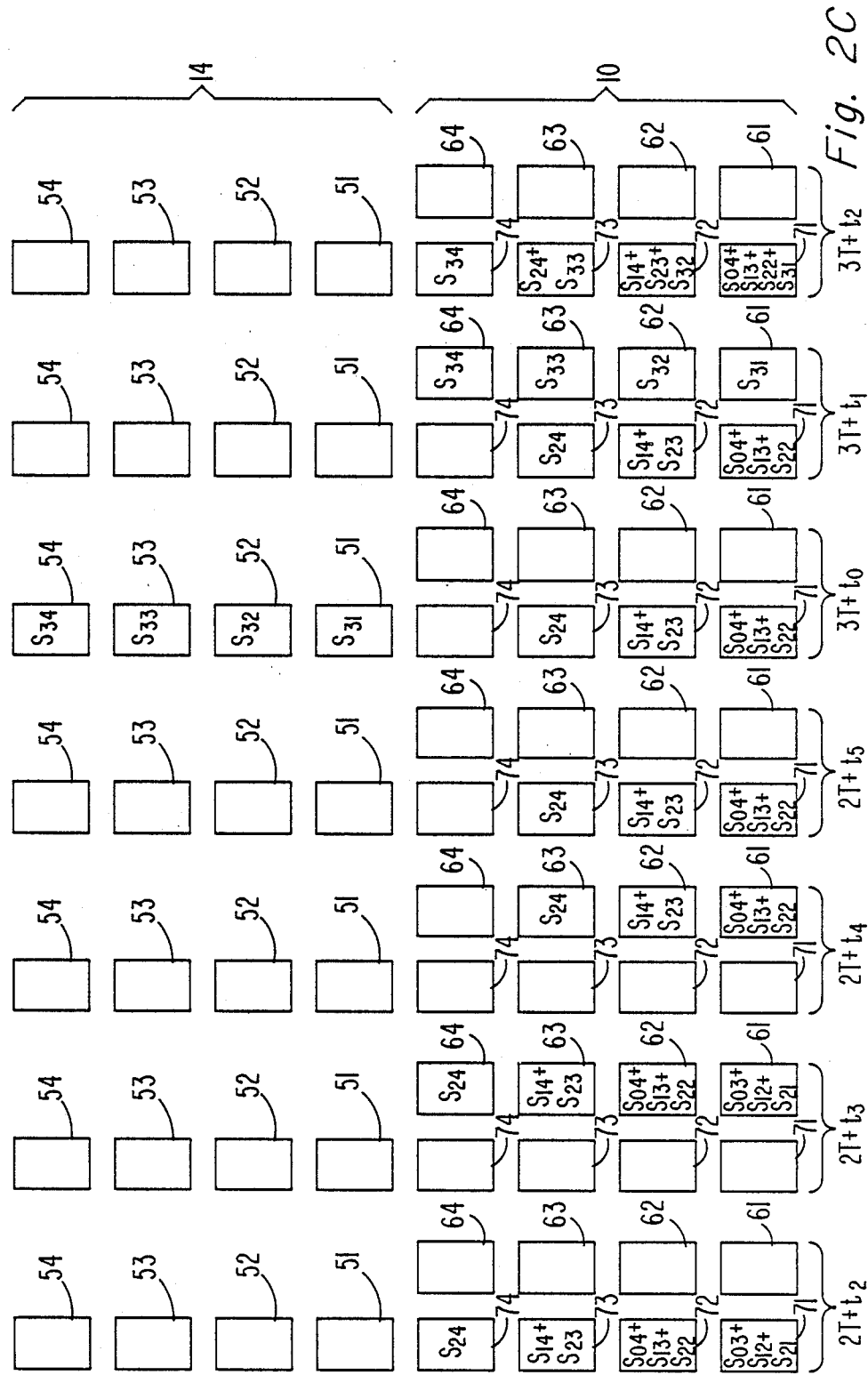

With reference to FIGS. 2C and 2D, the time-delay-integration results of these repeated operations begins to become evident at time $3T+t_2$. Between times $3T+t_3$ and $3T+t_4$, the charge packet shifted out of charge transfer stage 61 into the output line register 15 will equal $S_{04}+S_{13}+S_{22}+S_{31}$. Between times $4T+t_3$ and $4T+t_4$, the charge packet shifted out of charge transfer stage 61 will equal $S_{14}+S_{23}+S_{32}+S_{41}$. The charge packets shifted out of storage register 10 are progressively later in time as a function of lower row position in CSD register 14. This compensates for an upward motion of the imager platform at a rate of one row per time interval T.

Figure 3A:
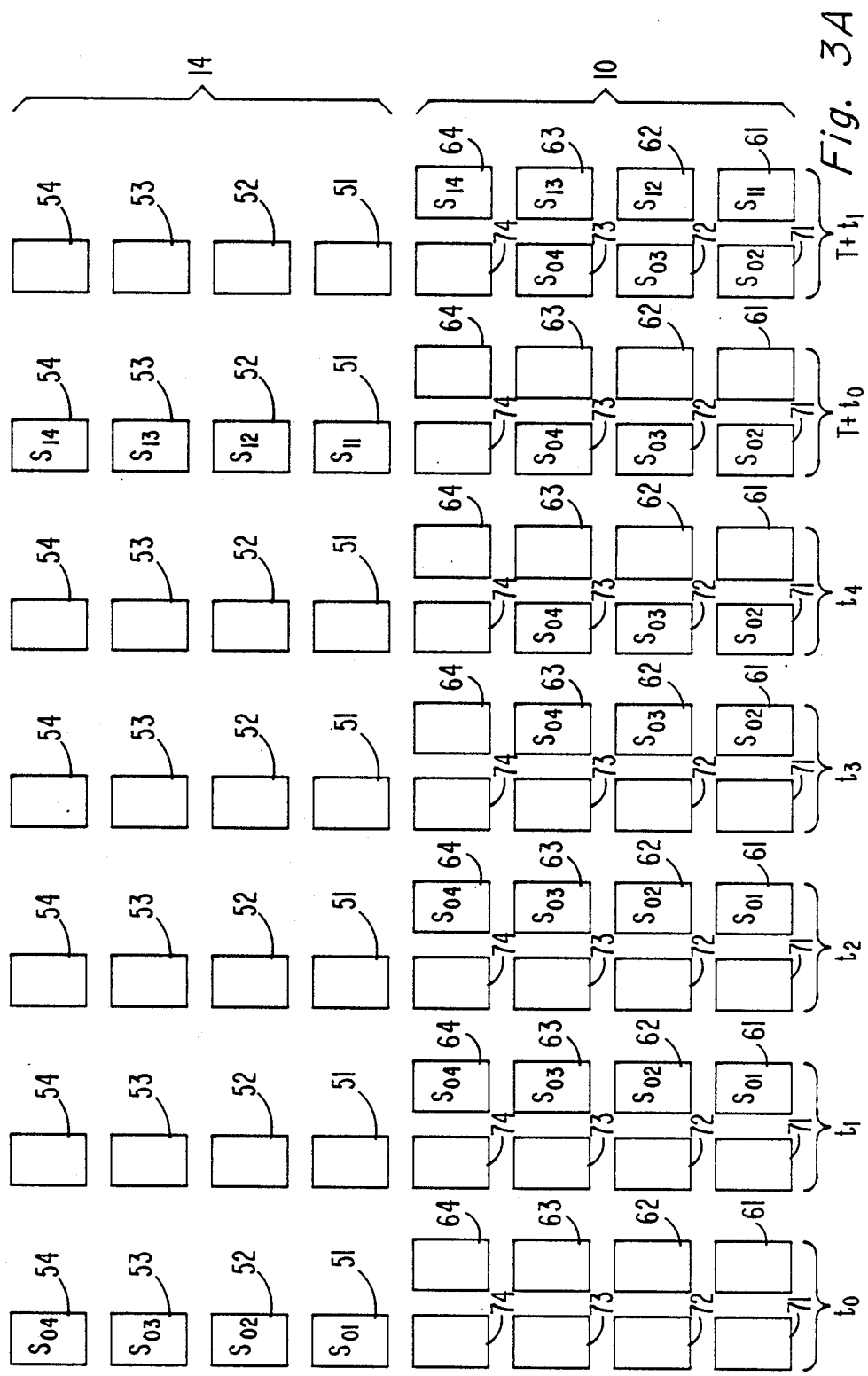

FIGS. 3A-C are a timing diagram of an alternative method for carrying out the time-delay-integration in charge storage register 10. The procedure carried out recurrently at intervals T is as follows, in modulo-T time. Between times $t_0$ and $t_1$, charge sweep operation in CSD register 14 is followed by shift register loading of the charge transfer channel 2 extensions into charge storage register 10. Between times $t_1$ and $t_2$, the previously stored contents of charge storage sites 4 are transferred into corresponding charge transfer stages in the charge transfer channel 2 extensions. Between times $t_2$ and $t_3$, all charge packets in the charge transfer channel 2 extensions are advanced one charge transfer stage, with the line of charge packets transferred out of CCD storage register 10 side-loading respective charge transfer stages of the output line register 15. Between times $t_3$ and $t_4$ the charge packets remaining in the charge transfer channel 2 extensions of CCD storage register 10 are shifted into corresponding charge storage sites 4. This alternative method of time-delay-integration is advantageous in requiring fewer shift operations between shift register charge transfer channels and charge storage sites, as compared to the method of FIGS. 2A-D. Variants of these two methods of time-delay-integration can be developed based on the foregoing teaching by those of normal skill in the art. For example, by reversing the order in which rows of charge packets are transferred with the CCD storage register 10 by operation of CSD register 14, one can reverse the direction of TDI operation. That is, objects moving the opposite way relative to the imager will be detected with increased sensitivity.

Figure 4:
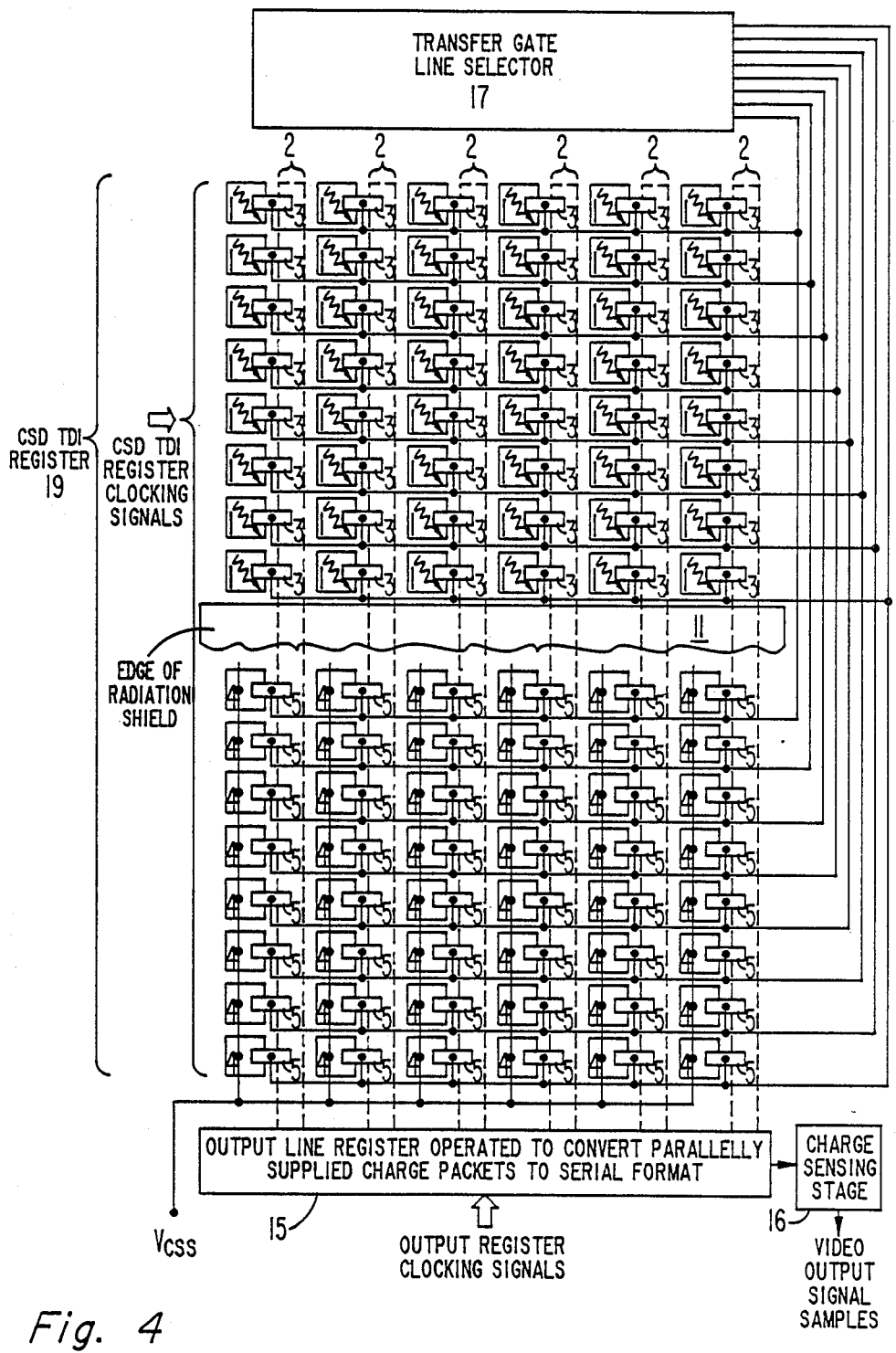
FIG. 4 is a block schematic of another infrared line imager embodying the invention. The charge sweep process involves the CCD storage register as well as the transfer register in the photosensing area of the imager.

FIG. 4 shows a modification of the FIG. 1 imager in which charge-sweep-device operation is extended into the CCD storage register 10 of FIG. 1. That is, registers 14 and 10 merge into one charge-sweep-device time-delay-integration register 19. The charge storage sites 4 become the collecting wells for CSD operation in FIG. 4, so storage gate electrode 12, storage control gate electrode 13 and the widening of charge transfer channels 2 to accommodate charge storage under gate electrode 12 are dispensed with. The transfer gate line selector 17 controls each successive row of transfer gates 3 in parallel with each successive row of transfer gates 5 in the CSD TDI register 19, so there is no need for a separate transfer gate line selector for the transfer gates 5. (Since there is no need to photoconvert impinging radiation in charge storage sites 4, one may make the transfer gates 5 continuous structures crossing over the charge storage sites 4 rather than discrete transfer gates 5 as shown in FIG. 4.)

FIG. 5 is a timing diagram for a simplified FIG. 4 imager. The operation carried out recurrently at intervals T is as follows, in modulo-T time. A charge sweep operation takes place between times $t_0$ and $t_4$, during which $V_{CSS}$ is held relatively positive to render charge storage sites 4 more positive than the charge transfer channel 2 extensions under radiation shield 11. Between times $t_0$ and $t_1$ the transmission gates 5 connecting the first row of charge transfer stages in register 19, including 61, to corresponding charge storage sites 4, including 71, are pulsed to lower the potential energy barriers to charge transfer otherwise induced thereunder. Charge sweep is from photosensor 51 all the way to charge storage site 71.

Accumulated photocharge is then swept from the other rows of photosensors 1 to fill corresponding rows of the charge storage sites 4, in an analogous manner to the way charge packets were swept from the first row of photosensor 1. Between times $t_1$ and $t_2$ charge sweep operation of register 19 removes accumulated photocharge from photosensor 52 to charge storage site 72. Between times $t_2$ and $t_3$ charge sweep operation of register 19 removes accumulated photocharge from photosensor 53 to charge storage site 73. Between times $t_3$ and $t_4$ charge sweep operation of register 19 removes accumulated photocharge from photosensor 54 to charge storage site 74. The charge packets swept into charge storage sites 71–74 merge with any charge packets previously stored therein.

Between times $t$ and $t_5$ the charge packets in charge storage sites 71–74 etc. are shifted to their corresponding charge transfer stages 61–64 etc. Between times $t_5$ and $t_6$, the charge packets in the charge transfer stages 61–64 of the charge transfer channel 2 extensions are each advanced one charge transfer stage in CSD TDI register 19. The line of charge packets transferred out of register 19 side-loads the output line register 15. Finally, between times $t_6$ and $t_7$ the charge packets in the charge transfer stages of the charge transfer channel 2 extensions (including 61–64) are shifted back to the corresponding charge storage sites 4. This shift back may be delayed for an interval approaching T in duration.

Figure 6:
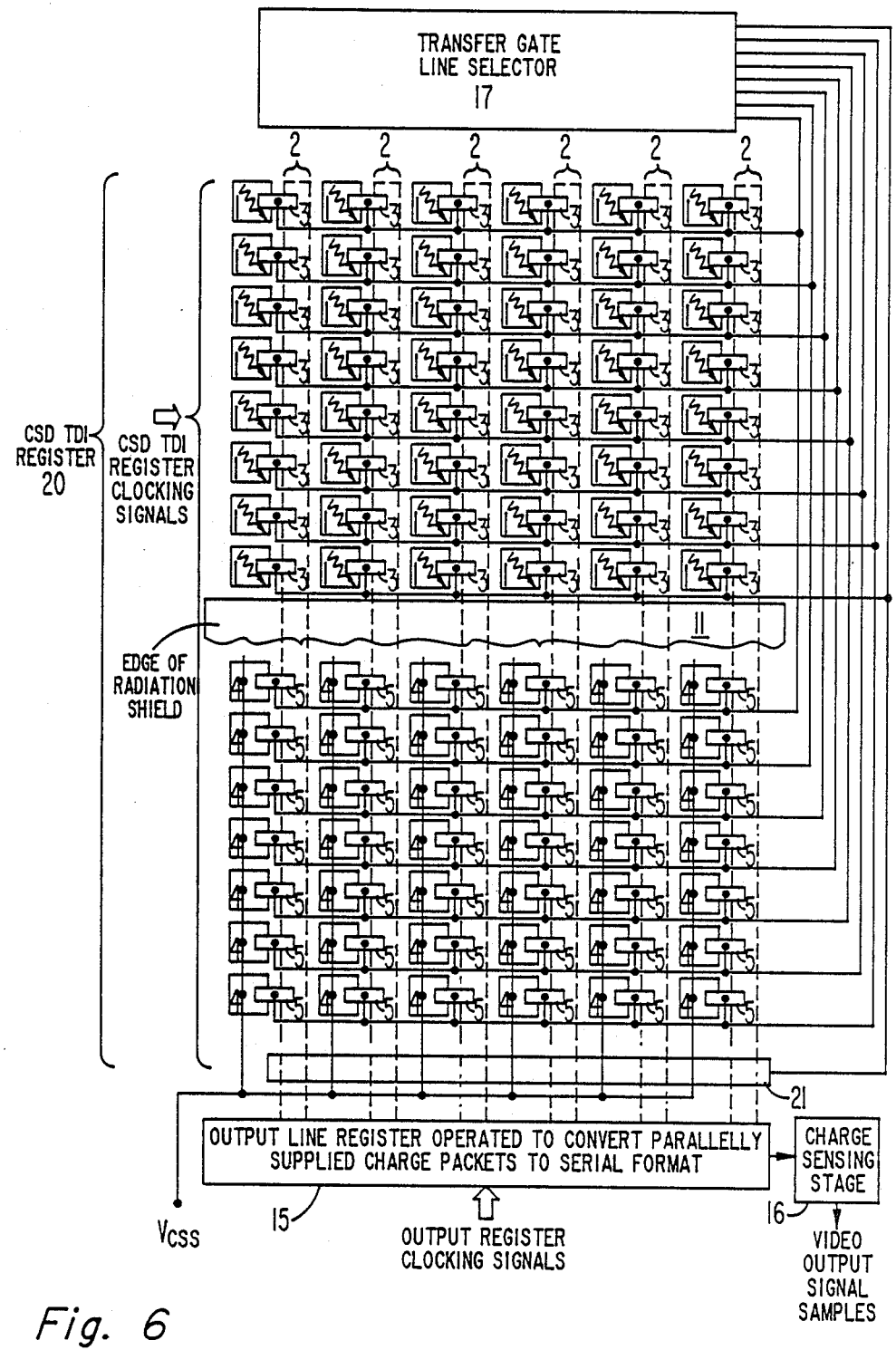
FIG. 6 is a block schematic of another infrared line imager embodying the invention. The charge sweep process involves the CCD storage register and CCD output line register, as well as the transfer register in the photosensing area of the imager.
Figure 7A:
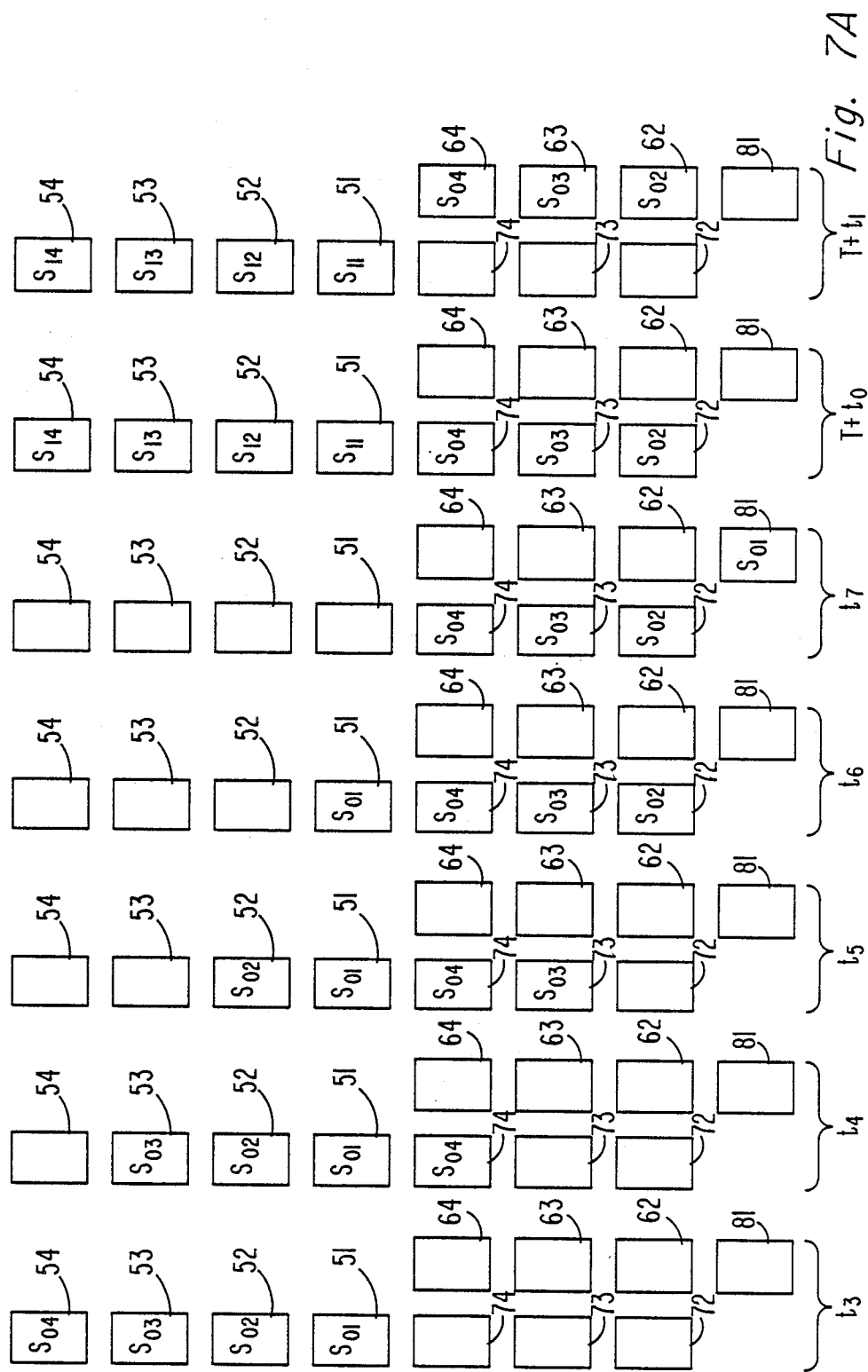

FIG. 6 shows a modification of the FIG. 4 imager in which CSD TDI register 19 is replaced by a CSD TDI register 20 in which one row of charge storage sites 4 is dispensed with and the function of that row of charge storage sites taken over by the side-loaded charge transfer stages of the output line register 15. To implement this, a transfer gate electrode 21 is placed over the ends of the charge transfer channel 2 extensions just before the output line register 15, so the side-loading of register 15 can be controlled.

FIGS. 7A–D are a timing diagram for the operation of an imager of the type shown in FIG. 6. Charge transfer stage 61 and its corresponding charge storage site 71 are dispensed with, and box 81 is representative of the charge transfer stage in output line register 15 that is side-loaded from charge transfer stage 62 when that stage is forward clocked. The cycle of TDI operation that recurs at intervals T may be described in modulo-T time, as follows.

Between times $t_0$ and $t_1$, the charge packet contents of charge storage sites 72, 73, 74 are shifted into the corresponding charge transfer stages in the 62, 63, 64 charge transfer channel 2 extensions. Between times $t_0$ and $t_1$, the charge packets in these charge transfer stages 62, 63, 64 are advanced one stage, side-loading charge transfer stage 81 in output line register 15 from charge transfer stage 62. Between times $t$ and $t_3$, the charge packets in the charge transfer stages 62, 63, 64 are shifted into the corresponding charge storage sites 72, 73, 74.

Between times $t_3$ and $t_4$ the charge sweep operation from photosensors 51, 52, 53 and 54 begins, with accumulated photocharge being swept from photosensor 54 to charge storage site 74. Then, between times $t$ and $t_5$ the photocharge accumulated in photosensor 53 is swept to charge storage site 73. Between times $t_5$ and $t_6$, photocharge is swept from photosensor 52 to charge storage site 72. Charge sweep operation is completed between times $t_6$ and $t_7$ by sweeping the photocharge from 51 all the way to charge transfer stage 81 in output line register 15, to merge with the charge packet previously side-loaded thereinto. Note that content of charge transfer stage 81 at time $3T+t_7$ in FIG. 7D is clearly a time-delay-integration response.

TDI operations may be carried out in the direction opposite to that described in connection with FIGS. 5 and 7. This is done simply by reversing the row order in which charge packets from photosensors 1 are read out by the charge sweep process.

Figure 8:
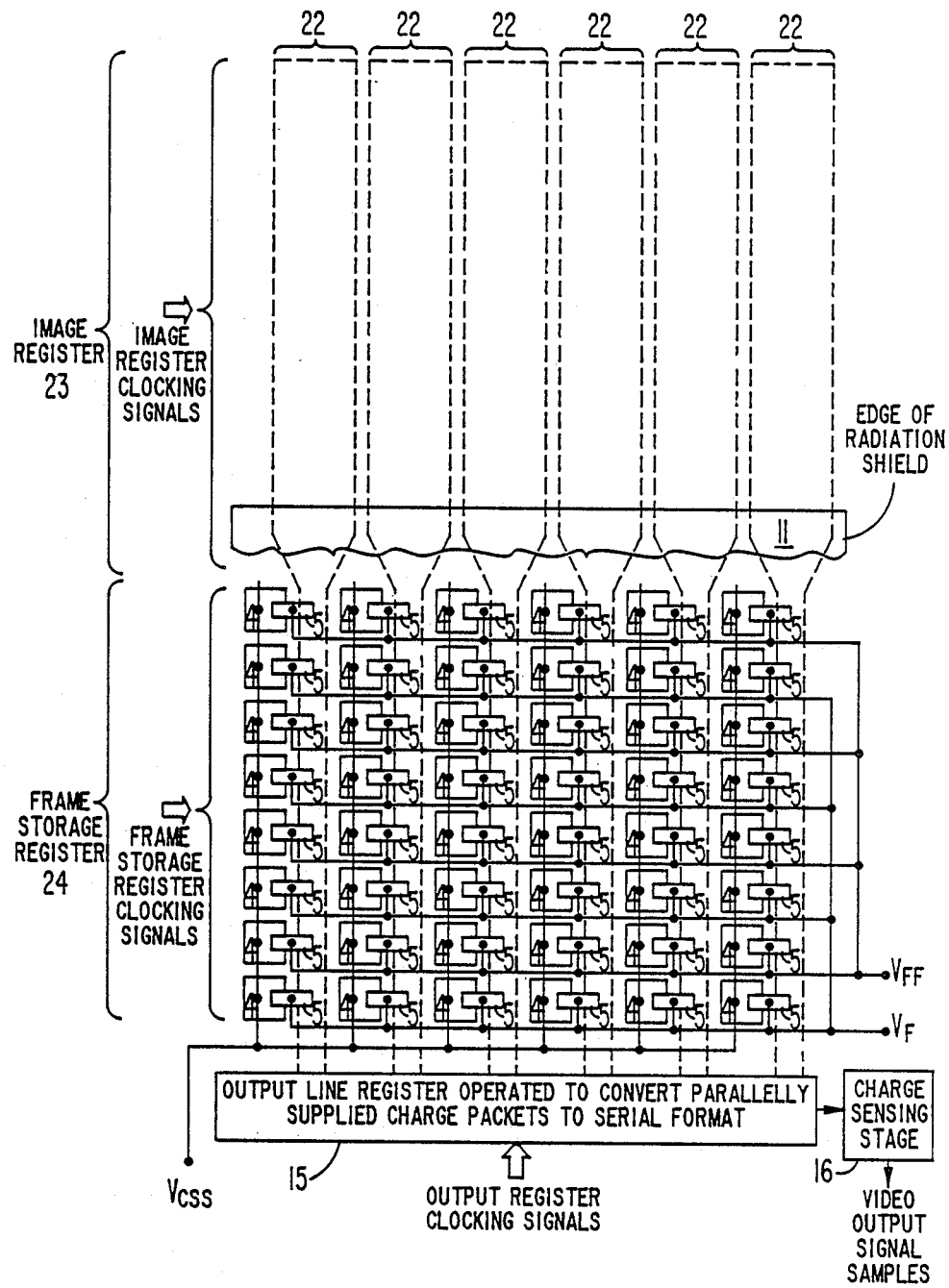
FIG. 8 is a block schematic diagram of a frame-transfer imager embodying the invention, using a frame-storage register with the capability of providing true line interlace from field to field.

The FIG. 8 CCD imager is a frame-transfer type. Image integration takes place directly in the successive charge transfer stages of the charge transfer channels 22 of an image (or A) register 23, over each field interval just as in prior art frame-transfer CCD imagers. As in prior art frame-transfer imagers, rows of charge packets are successively transferred from image register 23 during field retrace times to be temporarily stored in a frame storage (or B) register 24. During each line retrace interval during field scan a successive row of charge packets from the frame storage register 24 side-loads the successive charge transfer stages of the output line (or C) register 15. Then, during the succeeding line trace interval, output line register 15 is forward clocked at pixel scan rate in shift-register operation to supply charge packets serially to charge sensing stage 16. Charge sensing stage 16 responds to each charge packet to generate a respective sample of a video output signal.

Frame storage register 24 has a structure similar to storage register 10 of the FIG. 1 imager, but is modified so that odd-numbered rows of transfer gate electrodes 5 receive a control voltage $V_f$ and even-numbered rows of transfer gates 5 receive a control voltage $V_{FF}$, rather than all transfer gate electrodes receiving a control voltage $V_{TG}$ in common. This allows transfer operations between charge storage sites 4 and their corresponding charge transfer stages in charge transfer channel 22 extensions to be carried out on an alternate-line basis. This permits the FIG. 8 imager to employ true line interlace from field to field, in which type of line interlace each line of charge packets has a full frame time to accumulate. True line interlace is preferred when there is relatively little fast motion and a large amount of fine detail in the image presented to the camera employing the solid state imager. Alternatively, the FIG. 8 imager can be operated to provide psuedo line interlace from field to field. With psuedo line interlace each line of charge packets supplied to charge sensing stage 16 has only one field time (one half a frame time) in which to accumulate. Each line of charge packets is generated by adding charge packets from pairs of successive charge transfer stages in charge transfer channels 22, with pair phasing being alternated from field to field. Psuedo line interlace is preferred when there is a substantial amount of fast motion and little fine detail in the image presented to the camera employing the solid state imager.

In an imager where image integration is carried out in the charge transfer stages of the image register CCDs themselves, all integated charge packets must be transferred out of the image register during each field retrace interval. It is this requirement that forestalls true line interlace operation in prior art frame-transfer CCD imagers, owing to their frame storage registers being strictly serial memories. In the FIG. 8 imager, all charge packets integrated in the charge transfer stages of the image register are transferred out during each field retrace interval. The image register 23 has as many rows of parallel charge transfer stages in its CCD charge transfer channels as there are active lines in a frame. Frame storage register 24, unlike the prior art serial-memory frame storage registers, has the property of being able to rearrange the order in which lines of charge packets integrated over a field time pass through it. This is owing to register 24 having auxiliary storage capabilities provided by charge storage sites 4.

In the timing diagrams of FIGS. 9A&B, 10A&B and 11A&B, boxes 91-94 represent charge transfer stages in the image register. They clock charge packets forward during frame transfer into the successive charge transfer stages 61-64 of field storage register 24, which stages 61-64 have corresponding charge storage sites 71-74 selectively connected to them for charge transfer.

FIGS. 9A and 9B are a timing diagram showing one way to achieve true line interlace from field to field. The recurrent cycle of operation that occurs over a frame time 2T can be described as follows in modulo-2T time.

At a time $t_0$ just prior to field transfer, an odd field of image samples has accumulated over the preceding field time in image-register 23 charge transfer stages 91-94. At time $t_1$ just after field transfer, these odd field samples have, by forward clocking of charge transfer channels 22 and their extensions into frame storage register 24, been transferred to corresponding frame-storage-register 24 charge transfer stages 61-64.

Between times $t_1$ and $t_2$ previous even-field charge packets stored in odd-numbered charge storage sites 71, 73 are transferred to their corresponding frame-storage-register 24 charge transfer stages 61, 63 to merge with the odd-field charge packets therein. This is done by appropriate pulsing in $V_f$ and $V_{CSS}$ voltages, while $V_{PF}$ remains unpulsed. Two charge packets accumulated over respective field intervals are combined in each of these charge merging operations to form a combined charge packet accumulated over a full frame interval comprising an even field followed by an odd field.

Between times $t_2$ and $t_3$, charge packets in even-numbered frame-storage-register 24 charge transfer stages 62, 64 are shifted to their corresponding charge storage sites 72, 74. This is done by appropriate pulsing in $V_{FF}$ and $V_{CSS}$, while $V_f$ remains unpulsed; and it leaves only charge packets sampling even field followed by odd field in the charge transfer channel 22 extensions into frame storage register 24. The conditions of charge storage at time $t_3$ are those at the outset of field scan. During each line retrace interval in field scan, charge packets in frame storage register 24 are advanced two charge transfer stages, with the line of charge packets transferred out of frame storage register 24 being used to side-load output line register 15. Each line of charge packets is then serially transferred from output line register 15 to charge sensing stage 16 during the subsequent line trace interval At time $T+t_0$ field scan is finished. An even field of image samples has accumulated over the preceding field time between times $t_3$ and $T+t_0$ in image-register charge transfer stages 91-94. Field transfer takes place, shifting those samples into frame-storage-register 24 charge transfer stages 61-64. Time $T+t_1$ is just after this field transfer is completed.

Between times $T+t_1$ and $T+t_2$ previous odd-field samples stored in even-numbered charge storage sites 72, 74 are transferred to their corresponding charge transfer stages 62, 64 to merge with the even-field charge packets therein. This is done by appropriate pulsing in $V_{FF}$ and $V_{CSS}$, while $V_F$ remains unpulsed. The combined charge packets resulting from these charge merging operations have been accumulated over a full frame interval comprising an odd field followed by an even field.

Between times $T+t_2$ and $T+t_3$, charge packets in odd-numbered frame-storage-register 24 charge transfer stages 61, 63 are shifted to their corresponding charge storage sites 71, 73. This is done by appropriate pulsing in $V_f$ and $V_{CSS}$, while $V_{FF}$ remains unpulsed and it leaves only charge packets sampling odd field followed by even field in the charge transfer channel 22 extensions into frame storage register 24. The conditions of charge storage at time $t_3$ are those at outset of field scan. During each line retrace intervals in that field scan, charge packets in frame storage register 24 are advanced two charge transfer stages, side-loading output line register 15 in preparation for the following line trace interval.

Figure 10A:
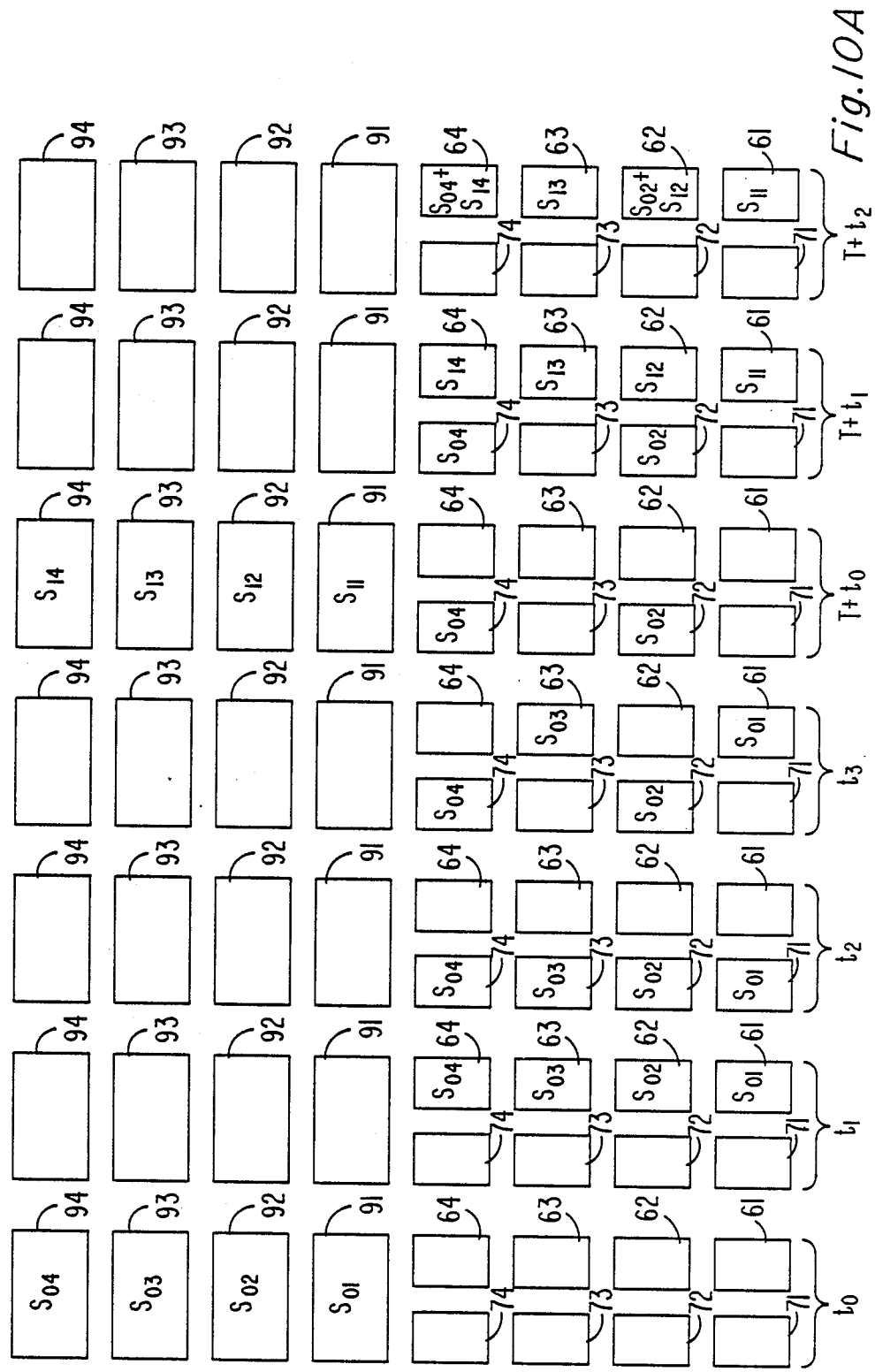
FIGS. 10A and 10B are a set of timing diagrams for an imager of the type shown in FIG. 8, for illustrating another method of achieving line interlace.
Figure 10B:
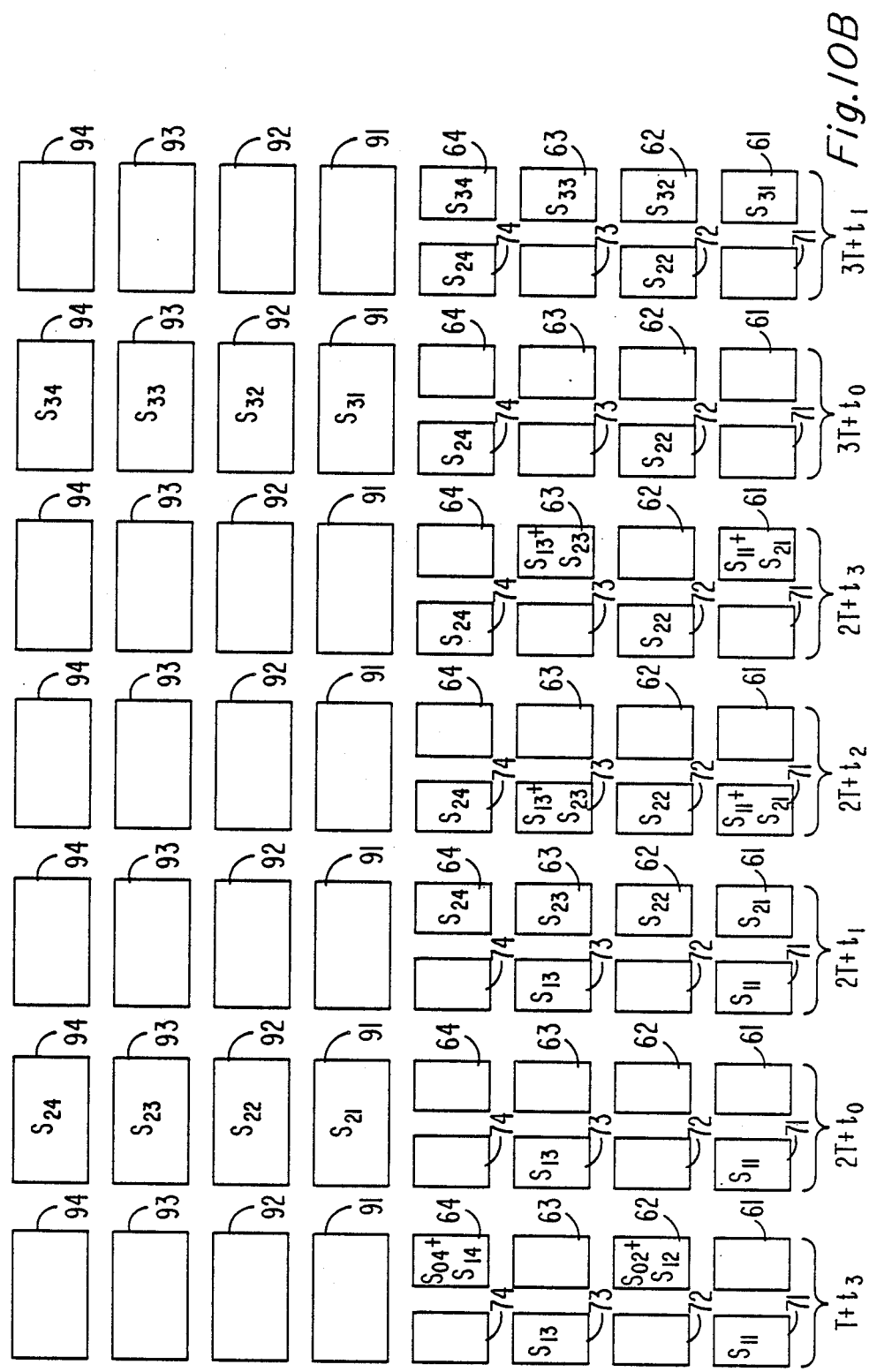

FIGS. 10A and 10B are the timing diagrams of an alternative way for achieving true line interlace in the FIG. 8 type of imager. Operation differs from that of FIGS. 9A and 9B in the steps taken between times $t_1$ and $t_2$, between times $t_2$ and $t_3$, between times $T+t_1$ and $T+t_2$, and between times $T+t$ and $T+t_3$ in modulo-2T time. Between times $t_1$ and $t_2$, and between times $T+t_1$ and $T+t_2$, charge packets in all the frame-storage-register 24 charge transfer stages 61-64 are transferred to their corresponding charge storage sites 71-74 by appropriate pulsing in $V_F$, $V_{FF}$, and $V_{TG}$ voltages. Between times $t_2$ and $t_3$, charge packets are transferred from only the odd-numbered ones 71, 73 of the charge storage sites to their corresponding frame-storage-register 24 charge transfer stages by appropriately pulsing $V_F$ and $V_{TG}$, while $V_{FF}$ remains unpulsed. Between times $T+t_2$ and $T+t_3$, charge packets are transferred from only the even-numbered ones 72, 74 of the charge storage sites to their corresponding frame-storage-register 24 charge transfer stages by appropriately pulsing $V_{FF}$ and $V_{TG}$, while $V_{FF}$ remains unpulsed.

FIGS. 11A and 11B are timing diagrams showing how psuedo line interlace can be achieved in the FIG. 8 type of imager. Operation in modulo-2T time is as follows.

At a time $t_0$ just prior to field transfer, an odd field of image samples has accumulated over the preceding field time in image-register 23 charge transfer stages 91-94. At time $t_1$ just after field transfer, these odd field samples have, by forward clocking of charge transfer channels 22 and their extensions into frame storage register 24, been transferred to corresponding frame-storage-register charge 24 transfer stages 61-64.

Between times $t_1$ and $t_2$, charge packets in odd-numbered rows of the charge transfer stages in frame-storage register 24 (including charge transfer stages 61 and 63) are transferred to corresponding ones of the charge storage sites 4 by suitable pulsing of $V_f$ and $V_{CSS}$ voltages. Between times $t_2$ and $t_3$, the charge packets left in the charge transfer stages (including 62 and 64) of frame-storage register 24 are advanced to the next rows of charge transfer stages (the next rows being one lower in ordinal numbering). Between times $t_3$ and $t_4$, the charge packets transferred to charge storage sites 4 between times $t_1$ and $t_2$ are transferred back to their corresponding charge transfer stages (including 61 and 63) to merge with the charge packets just advanced into those stages. After time $t_4$ the charge packets in the charge transfer channel 22 extensions through frame storage register 2 are advanced by one charge transfer stage the first line retrace interval and by two charge transfer stages each succeeding line retrace interval. This loads a respective line of charge packets in parallel with the successive charge transfer stage of output line register 15 in each line retrace interval. During the ensuing line trace interval, each line of charge packets is serially transferred at pixel scan rate from output line register 15 to charge sensing stage 16.

At time $T+t_0$ field scan is finished. An even field of image samples has accumulated over the preceding field time between times $t_4$ and $T+t_0$ in image-register charge transfer stages 91–94. Field transfer takes place, shifting those samples into frame-storage-register 24 charge transfer stages 61–64. Time $T+t_1$ is just after this field transfer is completed.

Between times $T+t_1$ and $T+t_2$ charge packets in even-numbered rows of the charge transfer stages in frame storage register 24 (including charge transfer stages 62 and 64) are transferred to corresponding ones of the charge storage sites 4 by suitable pulsing of $V_{FF}$ and $V_{CSS}$ voltages. Between times $T+t_2$ and $T+t_3$, the charge packets left in the charge transfer stages (including 61 and 63) of frame storage register 24 are advanced to the next rows of charge transfer stages. The line of charge packets (including $S_{11}$) displaced from frame storage register 24 loads output line register 15 charge transfer stages in parallel. Between times $T+t_3$ and $T+t_4$, the charge packets transferred to charge storage sites 4 betwen times $T+t_1$ and $T+t_2$ are transferred back to their corresponding charge transfer stages (including 62 and 64) to merge with the charge packets just advanced into those stages. After time $T+t_4$ the charge packets in output line register 15 are clocked out serially to charge sensing stage 16, and the response to them is blanked. Thereafter the charge packets in the charge transfer channel 22 extensions through frame transfer register 24 are advanced by two charge transfer stages each line retrace interval, to load a respective line of charge packets in parallel into the successive charge transfer stages of output line register 15. During the ensuing line trace interval throughout field scan, each line of charge packets is serially transferred at pixel scan rate from output line register 15 to charge sensing stage 16. Note the summation of image samples in adjacent rows differs in spatial phasing at time $t_4$ and $T+t_4$. The response to the last line of image samples from charge sensing stage 16 is blanked.

Selection can be made between true line interlace and psuedo line interlace of the FIG. 8 imager. This selection can be made based on the motion and detail contents of the images the FIG. 8 imager is likely next to receive.

Rather than using one transfer gate electrode 5 per charge storage site 4 and transferring charge both into and out of that charge storage site 4 through the same channel selectively induced under that transfer gate electrode 5, as has hereinbefore been described, transfer gate electrode 5 may be used solely for facilitating charge transfer to the charge storage site 4 in variants of the imagers shown in FIGS. 1, 4, 6 and 8. As will be discussed in connection with FIGS. 12A, 12B and 12C, a further transfer gate electrode 6 may then be used for facilitating charge transfer from the charge storage site back to the charge transfer channel 2 (or 22).

In fact, for certain shift and add operations, each charge storage site 4 may be replaced by a respective short, auxiliary CCD charge transfer channel. A transfer gate electrode 5 is pulsed to transfer charge into the input port of the auxiliary CCD charge transfer channel from a relatively earlier stage in a charge transfer channel 2 (or 22), and a transfer gate electrode 6 is pulsed to transfer charge from the output port of the auxiliary CCD charge transfer channel to a relatively later stage of the charge transfer channel 2 (or 22).

Figure 12C:
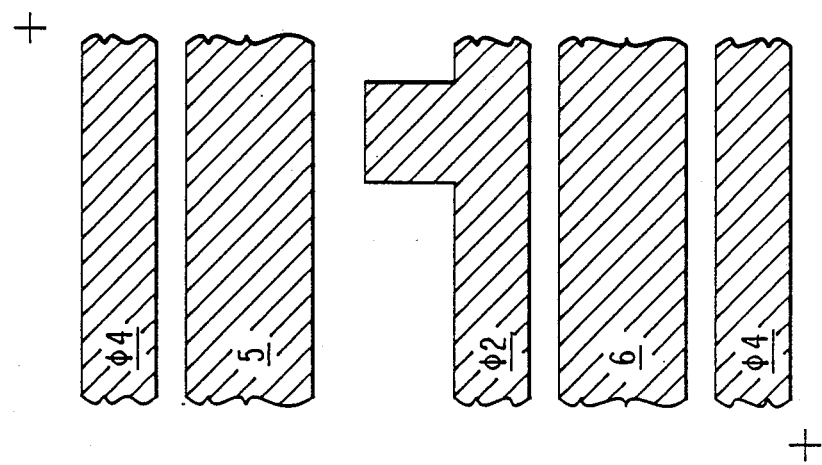
FIGS. 12A, 12B and 12C show in respective plan views, the charge transfer channel structure, first-polysilicon-layer gate electrode structure, and second-polysilicon-layer gate electrode structure of a basic cell for a storage register constructed in accordance with the invention.
Figure 12B:
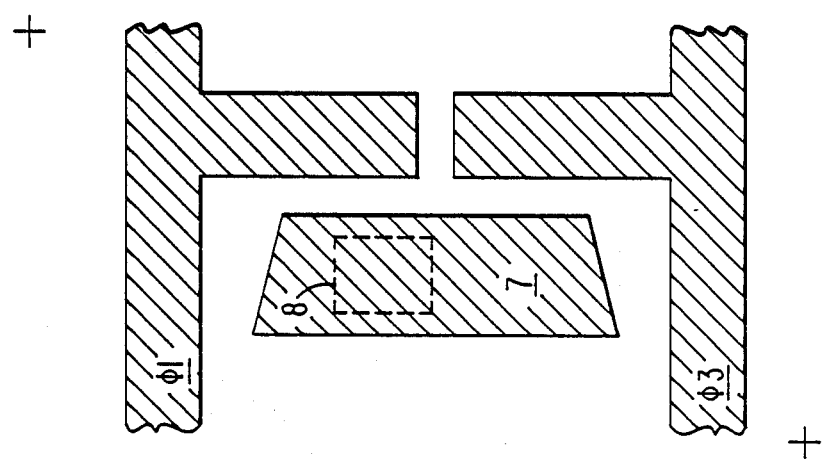
Figure 12A:
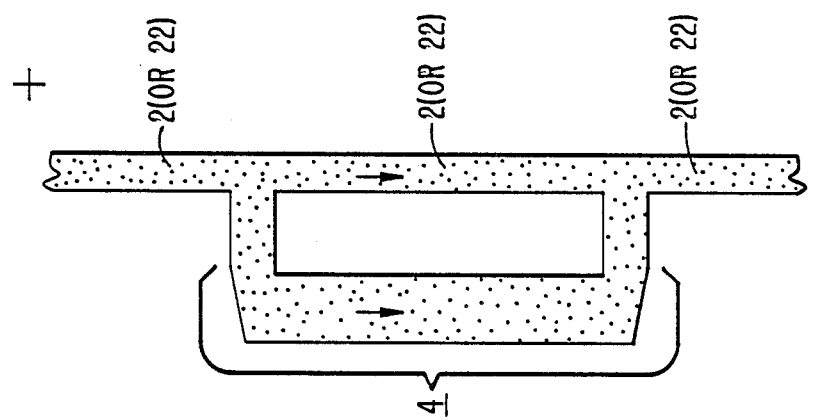

FIGS. 12A, 12B and 12C are plan views respectively of the transfer channel structure of a basic storage register cell, of the first-polysilicon-layer structure of that cell, and of its second-polysilicon-layer structure. It is difficult to depict, in an understandable way, a CCD structure in a single figure of drawing. It is suggested that the reader copy FIGS. 12A, 12B and 12C to place at least FIGS. 12B and 12C into the form of transparencies. The FIGS. 12B and 12C transparencies can then be successively overlaid on FIG. 12A, aligning the alignment crosses in their lower left and upper right corners with those of the underlying FIG. 12A to obtain proper registration of the figures.

In general, the process steps for making the imager are conventional, with the charge transfer channels of the imager being formed in or just beneath the top surface of a silicon die before the gate electrode structures are made. The silicon die is covered with a layer of insulating oxide, then a first layer of polysilicon is grown on the oxide. The first layer of polysilicon is selectively etched to form gate electrodes, which are covered by another layer of insulating oxide. A second layer of polysilicon is grown on this oxide and is selectively etched to form further gate electrodes. Still another layer of insulating oxide is laid down, which is selectively etched to provide access windows to the gate electrodes. A third layer of polysilicon, or alternatively a layer of top metalization (usually aluminum), is placed for ohmically contacting the gate electrodes and is selectively etched into electrical conductors. A top glass is placed over the imager except at bond pad locations in the third polysilicon layer or the top metalization.

FIG. 12A shows in plan view, as a speckled shape, the charge transfer channel structure of a basic storage register cell, which structure reposes in the bulk of the silicon imager die, near its top surface. The FIG. 12A charge transfer channel structure is defined by channel stop structure bounding it. The channel stop structure may be defined by field oxide or by p+ implant into the surface of the silicon substrate, as known in the art. The FIG. 12A charge transfer channel structure comprises a portion of a charge transfer channel 2 (or 22) extending through the storage register and a "cup handle" auxiliary charge transfer channel in which a charge storage site 4 is to be electrostatically induced.

The charge storage site 4 is induced under a respective first-polysilicon-layer storage gate electrode 7 as shown in FIG. 12B. Each storage gate electrode 7 is ohmically contacted from the third-polysilicon layer or from the top layer metalization, insulated from and extending over the first-polysilicon-layer electrodes of FIG. 12B and the second-polysilicon-layer electrodes of FIG. 12B and the second-polysilicon-layer electrodes of FIG. 12C, contact being made in the area indicated by the dashed-line rectangle 8.

Charge transfer in charge transfer channel 2 (or 22) of FIG. 12A is in response to successive-in-time four-phase clocking voltages $V_{\phi 1}$, $V_{\phi 2}$, and $V_{100\,4}$ applied to cyclically repeating succession of $\phi 1$, $\phi 2$, $\phi 3$ and $\phi 4$ gate electrodes. This causes the direction of forward-clocked charge transfer to be generally downward in the charge transfer channel 2 (or 22) and the "cup handle" auxiliary charge transfer channel, as indicated by arrows drawn on those charge transfer channels in FIG. 12A. As shown in FIG. 12B the $\phi 1$ and $\phi 3$ gate electrodes are constructed in the first polysilicon layer; and as shown in FIG. 12C the $\phi 2$ and $\phi 4$ gate electrodes are constructed in the second polysilicon layer.

As shown in FIG. 12C, the transfer gate electrodes 5 and 6 are also constructed in the second polysilicon layer. As long as the transfer gate electrodes 5 and 6 have relatively negative barrier-inducing voltages applied to them, there is no transfer of charge in either direction betwee charge transfer channel 2 (or 22) and charge storage site 4. Consider now how charge packets may be transferred into and out of the charge storage sites 4. Either of two basic modes of transfer may be used.

In the mode of transfer previously referred to, wherein transfer gate electrodes 5 are pulsed to transfer charge into charge storage sites 4 and wherein transfer gate electrodes 6 are pulsed to transfer charge out of charge storage sites 4, operation is as now to be described. Transfer of charge packets into the charge storage sites 4 will be first described.

Initially the charge packets are presumed to be in potential energy wells induced in charge transfer channels 2 (or 22) by applying relatively positive voltages to gate electrodes behind the $\phi 2$ gate electrodes. The $\phi 2$ and $\phi 3$ gate electrodes have relatively negative voltages applied to them for inducing barriers to charge transfer in the portions of charge transfer channels 2 (or 22) beneath them.

The transfer gate electrodes 5, which have had a relatively negative, barrier-inducing voltage applied to them are supplied a more positive voltage to lower the barriers to charge transfer; and the voltages applied to the gate electrodes behind the $\phi 2$ gate electrodes are made more negative to force charge transfer into the portions of the "cup-handle" auxiliary charge transfer channels under transfer gate electrodes 5. Storage gate electrodes 7 are made more positive than transfer gate electrodes 5 to transfer the charge packets into charge storage sites 4 induced thereunder. The transfer gate electrodes 6 receive a relatively negative barrier-inducing potential, holding the transferred charge packets from transferring forward out of the charge storage sites 4. The transfer gate electrodes 5 are made to receive a relatively negative barrier-inducing potential after charge transfer to charge storage sites 4, keeping the charge packets in the charge storage sites 4 from transferring backward from the charge storage sites 4 into the charge transfer channels 2 (or 22), as normal forward clocking of the charge transfer channels 2 (or 22) is resumed.

The transfer of charge packets from the charge storage sites 4 back into the charge transfer channels 2 (or 22) will now be described. The transfer back is made when $\phi 2$ gate electrodes receive relatively negative, barrier-inducing voltage and $\phi 3$ gate electrodes receive relative positive, well-inducing voltage. Transfer gate electrodes 6 which have had a relatively negative, barrier-inducing voltage applied to them are supplied a more positive voltage to lower the barriers to charge transfer; and the storage gate electrodes 7 are made more negative to force charge transfer to the portions of the charge transfer channels 2 (or 22) under the $\phi 3$ gate electrodes. Thereafter transfer gate electrodes 6 are made more negative to re-establish the barriers to charge transfer under them. Normal forward clocking of charge transfer channels 2 (or 22) can then resume.

Another basic mode of charge transfer between charge transfer channels 2 and charge storage sites 4, alternative to that just described, allows charge transfer into and out of each charge transfer site by two parallel paths, one under a transfer gate electrode 5 and the other under a transfer gate electrode 6. This is similar to a basic cell for a charge storage register that uses one transfer gate electrode per charge storage site 4, with the $\phi 2$ and $\phi 4$ gate electrodes having barrier-inducing potentials applied to them during transfers of charge into and out of charge storage sites 4. However, the two routes for charge transfer better assure the complete transference of charge into and out of charge storage sites 4 than with the single-transfer-gate-electrode basic cell. This permits higher frequency clocking of the imager than would otherwise be possible.

Several variants of the imagers thusfar described are possible. The charge storage sites 4 may be provided with anti-blooming drains or with dump drains to provide for subtracting some portions of the charge packets stored there. Subtraction of excessive background charge can be made using such drains. Images of the general type described above, but having more charge storage sites 4 than photosensors 1, can be constructed. These imagers can be clocked so that each charge packet is apportioned for storage in a respective set of charge storage sites 4, rather than in one respective charge storage site 4. Each set of charge storage sites 4 will be arranged serially along one of charge transfer channels 2. This arrangement can increase the dynamic range of the output response of the imager. The scope of the following claims should be construed to encompass such variants as accord with the spirit of the invention thusfar described.

What is claimed is:

1. A charge-coupled-device (CCD) storage register located along a surface of a substrate of semiconductive material, said CCD storage register comprising:

a plurality of CCD charge transfer channels in parallel array along said surface of said substrate, having respective input ports in parallel alignment into which charge packets are periodically transferred, having respective output ports in parallel alignment, and being separated from each adjoining one of said CCD charge transfer channels by a spacing therealongside, each CCD charge transfer channel including a succession of respective charge transfer stages between its input and output port;

a corresponding charge storage site along said surface of said substrate for each of said charge transfer stages in the spacing alongside the CCD charge transfer in which the charge transfer stage is included;

a respective selective transmission gate selectively connecting each of said charge transfer stages and its corresponding charge storage site;

means for transferring charge packets from at least selected ones of the charge transfer stages of said CCD charge transfer channels into their said corresponding charge storage sites during first selected times, said means except for the accumulation of dark current being the exclusive means of introducing charge into said charge storage sites;

means for controlling each of said respective transmission gates to transfer during said first selected times charge packets from said at least selected ones of said charge transfer stages into their said corresponding charge storage sites; and means for transferring during second selected times charge packets from at least selected ones of said charge storage sites into respective charge transfer stages of said CCD charge transfer channels from which channels those charge packets were transferred during said first selected times.

2. A CCD storage register as set forth in claim 1 wherein said means for transferring during second selected times charge packets from at least selected ones of said charge storage sites comprises means for controlling each of said respective transmission gates to transfer during said second selected times charge packets from said at least selected ones of said charge storage sites back to their corresponding charge transfer stages.

3. A CCD register as set forth in claim 1 wherein a respective further selective transmission gate selectively connects each of said charge storage sites and a respective charge transfer stage located after that to which the charge storage site corresponds in the CCD charge transfer channel in which that corresponding charge transfer stage is included; and wherein said means for transferring during second selected times charge packets from at least selected ones of said charge storage sites comprises means for controlling each said respective further transmission gate to transfer during said second selected times charge packets from said at least selected ones of said charge storage sites to said respective charge transfer stages located after those to which they respectively correspond in said CCD charge transfer channels.

4. In combination with a CCD storage register as set forth in claim 1;

a further CCD charge transfer channel included along said surface of said substrate with said CCD storage register, disposed across the output ends of said plurality of CCD charge transfer channels in parallel array within said storage register, said further CCD charge transfer channel including a succession of charge transfer stages side-loaded with charge packets from respective ones of the output ends of said plurality of CCD charge transfer channels in parallel array within said storage register, said further CCD charge transfer channel having an output port following its succession of charge transfer stages through which said side-loaded charge packets are serially transferred responsive to forward clocking voltages applied during line trace intervals to gate electrodes crossing said further CCD charge transfer channel; and a charge sensing circuit having an input port receptive of charge packets transferred thereto from the output port of said further CCD charge transfer channel and having an output port for supplying output signal samples responsive to the charge packets received at its input port.

5. A charge-sweep-device solid-state imager including a CCD storage register as set forth in claim 1, said solid-state imager including in addition to said CCD storage register:

photosensors arrayed by row and by column along a surface of said substrate;

a respective charge transfer channel associated with each column of photosensors, each said charge transfer channel having a succession of charge transfer stages corrsponding to respective photosensors, which succession of charge transfer stages is followed by an additional charge transfer stage defined by a storage gate electrode and control gate electrode crossing that charge transfer channel, followed in turn by an output port of that charge transfer channel connecting to a respective one of the input ports, of said CCD storage register;

transfer gates between said photosensors and said corresponding charge transfer stages, operable to transfer charge packets from said photosensors row by row;

a charge sensing circuit, having an input port for receiving charge packets serially supplied thereto, and having an output port for supplying samples of video output signal responsive to the charge packets received at its input port; and an output CCD shift register located along said surface of said substrate, having a succession of charge transfer stages periodically side-loaded with charge packets from respective ones of the output ports of the charge transfer channels in said CCD storage register, and having an output port connected for transferring said side-loaded charge packets serially to the input ports of said charge sensing stage.

6. A charge-sweep-device solid-state imager as set forth in claim 3 including:

means for operating said CCD storage register in a time-delay-integration mode.

7. A charge-sweep-device solid-state imager including a CCD storage register as set forth in claim 1, said solid-state imager including in addition to said CCD storage register:

photosensors arrayed by row and by column along a surface of said substrate;

a respective charge transfer channel associated with each column of photosensors, each said charge transfer channel having a succession of charge transfer stages corrsponding to respective photosensors, which succession of charge transfer stages is followed by an output port of that charge transfer channel connecting to a respective one of the input ports of said CCD storage register;

means for providing charge sweep operation of said charge transfer channels associated with each column of photosensors, together with the portions of the charge transfer channels in said CCD storage register up to a row of charge storage sites correspond to the row of photosensors from which charge is currently swept;

transfer gates between said photosensors and said corresponding charge transfer stages, operable to transfer charge packets from said photosensors row by row during said charge sweep operation;

a charge sensing circuit, having an input port for receiving charge packets serially supplied thereto, and having an output port for supplying samples of video output signal responsive to the charge packets received at its input port; and an output CCD shift register located along said surface of said substrate, having a succession of charge transfer stages periodically side-loaded with charge packets from respective ones of the output ports of the charge transfer channels in said CCD storage register, and having an output port connected for transferring said side-loaded charge packets serially to the input ports of said charge sensing stage.

8. A charge-sweep-device solid-state imager as set forth in claim 7 including:

means for operating said CCD storage register in a time-delay-integration mode.

9. A frame-transfer type of solid-state imager using a CCD storage register as set forth in claim 1 as its frame storage register, said solid-state imager including in addition to said CCD storage register:

an image register comprising a plurality of CCD charge transfer channels in parallel array along said surface of said substrate for receiving a radiant energy image for photoconversion, said CCD charge transfer channels having respective output ports connected to respective ones of the input ports of the CCD charge transfer channels in said CCD storage register for transferring charge packets thereto during field retrace intervals;

a charge sensing circuit, having an input port for receiving charge packets serially supplied thereto and having an output port for supplying samples of video output signal responsive to the charge packets received at its input port; and an output CCD shift register located along said surface of said substrate; having an succession of charge transfer stages side-loaded with charge packets from respective ones of the output ports of the charge transfer channels in said CCD storage register during line retrace intervals, and having an output port connected for transferring said side-loaded charge packets serially to the input of said charge sensing stage during line trace intervals.

10. A frame-transfer type of solid-state imager as set forth in claim 9 including:

means for operating said CCD storage register to provide true field-to-field line interlace.

11. A frame-transfer type of solid-state imager as set forth in claim 9 including:

means for operating said CCD storage register to provide pseudo field-to-field line interlace.

12. A frame-transfer type of solid-state imager as set forth in claim 9 including:

means for operating said CCD storage register to selectively provide true or pseudo field-to-field line interlace.

13. A CCD storage register as set forth in claim 1 wherein the sole means for removing charge from said corresponding charge storage sites is said means for transferring during second selected times charge packets from at least selected ones of said charge storage sites into charge transfer stages of respective ones of said CCD charge transfer channels from which they were respectively transferred during said first selected times.

14. A CCD storage register located along a surface of a substrate of semiconductive material, said CCD storage register comprising:

a purality of CCD charge transfer channels in parallel array along said surface of said substrate, having respective input ports in parallel alignment into which charge packets are periodically transferred, having respective output ports in parallel alignment, and being separated from each adjoining one of said CCD charge transfer channels by a spacing therealongside, each CCD charge transfer channel including a succession of respective charge transfer stages between its input and output port;

a corresponding charge storage site along said surface of said substrate for each of said charge transfer stages in the spacing alongside the CCD charge transfer channel in which the charge transfer stage is included;

a respective selective transmission gate selectively connecting each of said charge transfer stages and its corresponding charge storage site;

means for protecting those portions of said substrate of semiconductive material wherein said plurality of CCD charge transfer channels and each of said corresponding charge storage sites are disposed, from receiving incident radiation as would otherwise by photoconverted to charge therein;

means for transferring charge packets from at least selected ones of the charge transfer stages of said CCD charge transfer channels into their said corresponding charge storage sites during first selected times via said respective selective transmission gates between them; and means for transferring charge packets during second selected times from at least selected ones of said charge storage sites into respective charge transfer stages of said CCD charge transfer channels from which channels those charge storage sites received charge packets during first selected times.

15. In combination with a CCD storage register as set forth in claim 14;

a further CCD charge transfer channel included along said surface of said substrate with said CCD storage register, disposed across the output ends of said plurality of CCD charge transfer channels in parallel array within said storage register, said further CCD charge transfer channel including a succession of charge transfer stages side-loaded with charge packets from respective ones of the output ends of said plurality of CCD charge transfer channels in parallel array within said storage register, said further CCD charge transfer channel having an output port following its succession of charge transfer stages through which said side-loaded charge packets are serially transferred responsive to forward clocking voltages applied during line trace intervals to gate electrodes crossing said further CCD charge transfer channel; and a charge sensing circuit having an input port receptive of charge packets transferred thereto from the output port of said further CCD charge transfer channel and having an output port for supplying output signal samples responsive to the charge packets received at its input port.

16. A CCD storage register as set forth in claim 14 wherein the sole means for removing charge from said corresponding charge storage sites is said means for transferring during second selected times charge packets from at least selected ones of said charge storage sites into charge transfer stages of respective ones of said CCD charge transfer channels from which they were respectively transferred during said first selected times.

17. A CCD storage register as set forth in claim 14 wherein the transferring of charge packets from at least selected ones of said charge storage sites during second selected times transfers them back to their corresponding charge transfer stages via said respective selective transmission gates.

18. A CCD storage register as set forth in claim 14 wherein
 a respective further selective transmission gate selectively connects each of at least selected ones of said charge storage sites and charge transfer stage located after those to which they respectively correspond, and wherein said means for transferring of charge packets from said at least selected ones of said charge storage sites during second selected time transfers them to said charge transfer stages located after those to which they respectively correspond in said CCD charge transfer channels.

19. A charge-sweep-device solid-state imager including a CCD storage register as set forth in claim 4, said solid-state imager including in addition to said CCD storage register:
 photosensors arrayed by row and by column along a surface of said substrate;
 a respective charge transfer channel associated with each column of photosensors, each said charge transfer channel having a succession of charge transfer stages corrsponding to respective photosensors, which succession of charge transfer stages is followed by an additional charge transfer stage defined by a storage gate electrode and control gate electrode crossing that charge transfer channel, followed in turn by an output port of that charge transfer channel connecting to respective one of the input ports of said CCD storage register;
 transfer gates between said photosensors and said corresponding charge transfer stages, operable to transfer charge packets from said photosensors row by row;
 a charge sensing circuit, having an input port for receiving charge packets serially supplied thereto, and having an output port for supplying samples of video output signal responsive to the charge packets received at its input port; and
 an output CCD shift register located along said surface of said substrate, having a succession of charge transfer stages periodically side-loaded with charge packets from respective ones of the output ports of the charge transfer channels in said CCD storage register, and having an output port connected for transferring said side-loaded charge packets serially to the input ports of said charge sensing stage.

20. A charge-sweep-device solid-state imager as set forth in claim 19 including:
 means for operating said CCD storage register in a time-delay-integration mode.

21. A charge-sweep-device solid-state imager including a CCD storage register as set forth in claim 14, said solid-state imager including in addition to said CCD storage register:
 photosensors arrayed by row and by column along a surface of said substrate;
 a respective charge transfer channel associated with each column of photosensors, each said charge transfer channel having a succession of charge transfer stages corrsponding to respective photosensors, which succession of charge transfer stages is followed by an additional an output port of that charge transfer channel connecting to a respective one of the input ports of said CCD storage register;
 means for providing charge sweep operation of said charge transfer channels associated with each column of photosensors, together with the portions of the charge transfer channels in said CCD storage register up to a row of charge storage sites correspond to the row of photosensors from which charge is currently swept;
 transfer gates between said photosensors and said corresponding charge transfer stages, operable to transfer charge packets from said photosensors row by row during said charge sweep operation;
 a charge sensing circuit, having an input port for receiving charge packets serially supplied thereto, and having an output port for supplying samples of video output signal responsive to the charge packets received at its input port; and
 an output CCD shift register located along said surface of said substrate, having a succession of charge transfer stages periodically side-loaded with charge packets from respective ones of the output ports of the charge transfer channels in said CCD storage register, and having an output port connected for transferring said side-loaded charge packets serially to the input ports of said charge sensing stage.

22. A charge-sweep-device solid-state imager as set forth in claim 21 including:
 means for operating said CCD storage register in a time-delay-integration mode.

23. A frame-transfer type of solid-state imager using a CCD storage register as set forth in claim 14 as its frame storage register, said solid-state imager including in addition to said CCD storage register:
 an image register comprising a plurality of CCD charge transfer channels in parallel array along said surface of said substrate for receiving a radiant energy image for photoconversion, said CCD charge transfer channels having respective output ports connected to respective ones of the input ports of the CCD charge transfer channels in said CCD storage register for transferring charge packets thereto during field retrace intervals;
 a charge sensing circuit, having an input port for receiving charge packets serially supplied thereto and having an output port for supplying samples of video output signal responsive to the charge packets received at its input port; and
 an output CCD shift register located along said surface of said substrate; having an succession of charge transfer stages side-loaded with charge packets from respective ones of the output ports of the charge transfer channels in said CCD storage register during line retrace intervals, and having an output port connected for transferring said sideloaded charge packets serially to the input of said charge sensing stage during line trace intervals.

24. A frame-transfer type of solid-state imager as set forth in claim 23 including:
means for operating said CCD storage register to provide true field-to-field line interlace.

25. A frame-transfer type of solid-state imager as set forth in claim 23 including:
means for operating said CCD storage register to provide pseudo field-to-field line interlace.

26. A frame-transfer type of solid-state imager as set forth in claim 23 including:
means for operating said CCD storage register to selectively provide true or pseudo field-to-field line interlace.

27. A CCD storage register located along a surface of a substrate of semiconductive material, said CCD storage register comprising:
a plurality of CCD charge transfer channels in parallel array along said surface of said substrate, having respective input ports in parallel alignment, having respective output ports in parallel alignment, and being separated from each adjoining one of said CCD charge transfer channels by a spacing therealongside, each CCD charge transfer channel including a succession of respective charge transfer stages between its input and output port;
means for cyclically clocking said charge transfer stages to transfer any charge packets in them to respectively succeeding charge transfer stages, transfer being by one charge transfer stage per clock cycle;
corresponding charge storage sites along said surface of said substrate for at least certain of said charge transfer stages in the spacing alongside the CCD charge transfer channel in which the charge transfer stage is included;
a respective selective transmission gate selectively connecting each of said certain charge transfer stages and its corresponding charge storage site;
means for transferring charge packets from at least selected ones of said certain charge transfer stages into said corresponding charge storage sites via their respective selective transmission gates during first selected times; and
a respective further selective transmission gate selectively connecting each corresponding charge storage site back to the CCD channel in which its corresponding charge transfer stage is located; but to a later charge transfer stage in that CCD channel;
means for transferring during second selected times charge packets, from said corresponding charge storage sites to the ones of said CCD charge transfer channels from which those charge storage sites received charge packets, via their respective further selective transmission gates.

28. In combination with a CCD storage register as set forth in claim 27;
a further CCD charge transfer channel included along said surface of said substrate with said CCD storage register, disposed across the output ends of said plurality of CCD charge transfer channels in parallel array within said storage register, said further CCD charge transfer channel including a succession of charge transfer stages side-loaded with charge packets from respective ones of the output ends of said plurality of CCD charge transfer channels in parallel array within said storage register, said further CCD charge transfer channel having an output port following its succession of charge transfer stages through which said sideloaded charge packets are serially transferred responsive to forward clocking voltages applied during line trace intervals to gate electrodes crossing said further CCD charge transfer channel; and
a charge sensing circuit having an input port receptive of charge packets transferred thereto from the output port of said further CCD charge transfer channel and having an output port for supplying output signal samples responsive to the charge packets received at its input port.

29. A CCD storage register as set forth in claim 28 wherein said corresponding charge storage sites are protected from receiving incident radiation as would otherwise be photoconverted to charge therein; and wherein charge packets are periodically transferred into the respective input ports of said plurality of CCD charge transfer channels.

30. A CCD storage register as set forth in claim 27 wherein said corresponding charge storage sites are protected from receiving incident radiation as would otherwise be photoconverted to charge therein; and wherein charge packets are periodically transferred into the respective input ports of said plurality of CCD charge transfer channels.

31. A CCD storage register as set forth in claim 27 wherein there is a corresponding charge storage site along said surface of said substrate for each of said charge transfer stages in the spacing alongside the CCD charge transfer channel in which the charge transfer stage is included.

32. A CCD storage register located along a surface of a substrate of semiconductive material, said CCD storage register comprising:
a plurality of CCD charge transfer channels in parallel array along said surface of said substrate, having respective input ports and respective output ports, and being separated from each adjoining one of said CCD charge transfer channels by a spacing therealongside, each CCD charge transfer channel including a succession of respective charge transfer stages between its input and output port;
means for admitting a respective sequential order of charge packets into each of the input ports of said plurality of CCD charge transfer channels;
means for cylically clocking said charge transfer stages to transfer charge packets in them to respectively succeeding charge transfer stages, transfer being by one charge transfer stage per clock cycle;
corresponding charge storage sites along said surface of said substrate for at least certain of said charge transfer stages in the spacing alongside the CCD charge transfer channel in which the charge transfer stage is included;
means for transferring charge packets from at least selected ones of said certain charge transfer stages into said corresponding charge storage sites during first selected times; and
means for transferring during second selected times charge packets, from said charge storage sites corresponding to certain charge transfer stages, to the ones of said CCD charge transfer channels from which those charge storage sites received charge packets, said second selected times being so chosen respective to said first selected times as to include at least one clock cycle between them, thereby to alter the sequential order of any charge packets at the output port of each said CCD charge transfer channel from the sequential order of charge packets at its input port.

* * * * *